United States Patent
Michelsen et al.

(10) Patent No.: US 12,436,748 B2
(45) Date of Patent: Oct. 7, 2025

(54) SYSTEMS FOR APPLICATION AND DATA DEPENDENCY IDENTIFICATION, VISUALIZATION, AND MANAGEMENT

(71) Applicant: The Travelers Indemnity Company, Hartford, CT (US)

(72) Inventors: Yushen C. Michelsen, South Windsor, CT (US); Chunlei Li, West Hartford, CT (US); Subash Maharjan, Charlottesville, VA (US); Yuan Su, Newark, DE (US); Andrew Lin, Glastonbury, CT (US); David Rollins, West Hartford, CT (US)

(73) Assignee: The Travelers Indemnity Company, Hartford, CT (US)

( * ) Notice: Subject to any disclaimer, the term of this patent is extended or adjusted under 35 U.S.C. 154(b) by 390 days.

(21) Appl. No.: 18/181,132

(22) Filed: Mar. 9, 2023

(65) Prior Publication Data

US 2024/0303052 A1    Sep. 12, 2024

(51) Int. Cl.
*G06F 8/41*      (2018.01)
*G06F 9/445*    (2018.01)

(52) U.S. Cl.
CPC .......... *G06F 8/433* (2013.01); *G06F 9/44526* (2013.01)

(58) Field of Classification Search
None
See application file for complete search history.

(56) References Cited

U.S. PATENT DOCUMENTS

| | | | | |
|---|---|---|---|---|
| 7,254,814 | B1* | 8/2007 | Cormier | G06F 9/44526 717/121 |
| 9,367,425 | B1* | 6/2016 | Hale | G06F 16/2379 |
| 2002/0147764 | A1* | 10/2002 | Krupczak | H04L 41/0213 709/202 |
| 2008/0201705 | A1* | 8/2008 | Wookey | G06F 8/658 717/175 |
| 2013/0263088 | A1* | 10/2013 | Hoff | G06F 9/45529 717/121 |
| 2018/0307506 | A1* | 10/2018 | Rudrappa Goniwada | G06F 8/66 |
| 2020/0285488 | A1* | 9/2020 | Yao | G06F 8/36 |
| 2021/0026756 | A1* | 1/2021 | Magnezi | G06F 11/3688 |
| 2022/0156053 | A1* | 5/2022 | Shaastry | G06F 8/433 |

* cited by examiner

*Primary Examiner* — Qing Chen
(74) *Attorney, Agent, or Firm* — RowanTree Law Group, PLLC; Carson C.K. Fincham

(57) ABSTRACT

Systems for application and data dependency identification, visualization, and management. In some embodiments, a plurality of dependency harvester applications/plugins may be utilized to automatically source dependency data that is then translated and/or converted into a standardized format that is utilized to generate and/or identify dependency relationships, e.g., across disparate computing platforms and/or environments. The results of these automatically-identified dependencies may then be utilized, for example, to provide an interface to project implementation personnel that can point out and/or quantify predicted errors. Such an automated dependency identification/harvesting system can dramatically reduce both personnel and time-to-implementation costs of projects implemented in a computing environment, particularly where the computing environment comprises a plurality of complex data and/or application interdependencies and/or relationships.

27 Claims, 13 Drawing Sheets

SYSTEMS FOR APPLICATION AND DATA DEPENDENCY IDENTIFICATION, VISUALIZATION, AND MANAGEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND

In software-driven environments there are often numerous relationships and interdependencies between various software applications, system variables, and/or system components. Modern software-driven environments in many industries, for example, often employ hundreds or thousands of coded applications that are interrelated in complex and often critical manners. Operating, updating, repairing, and/or maintaining such environments is a time-consuming and resource-intensive task that relies heavily on proper management of such relationships and/or dependencies. Each ecosystem of an environment typically requires native expertise to interpret, however, as each ecosystem typically comprises proprietary, unique, and/or specialized formats, languages, and/or procedures. Accordingly, software-driven environments with many (e.g., dozens of) distinct ecosystems require either (i) a large number of specially-trained human resources to interpret or (ii) extensive simulation or off-production testing, for any change (e.g., update or repair) to be properly implemented.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Figure 1:
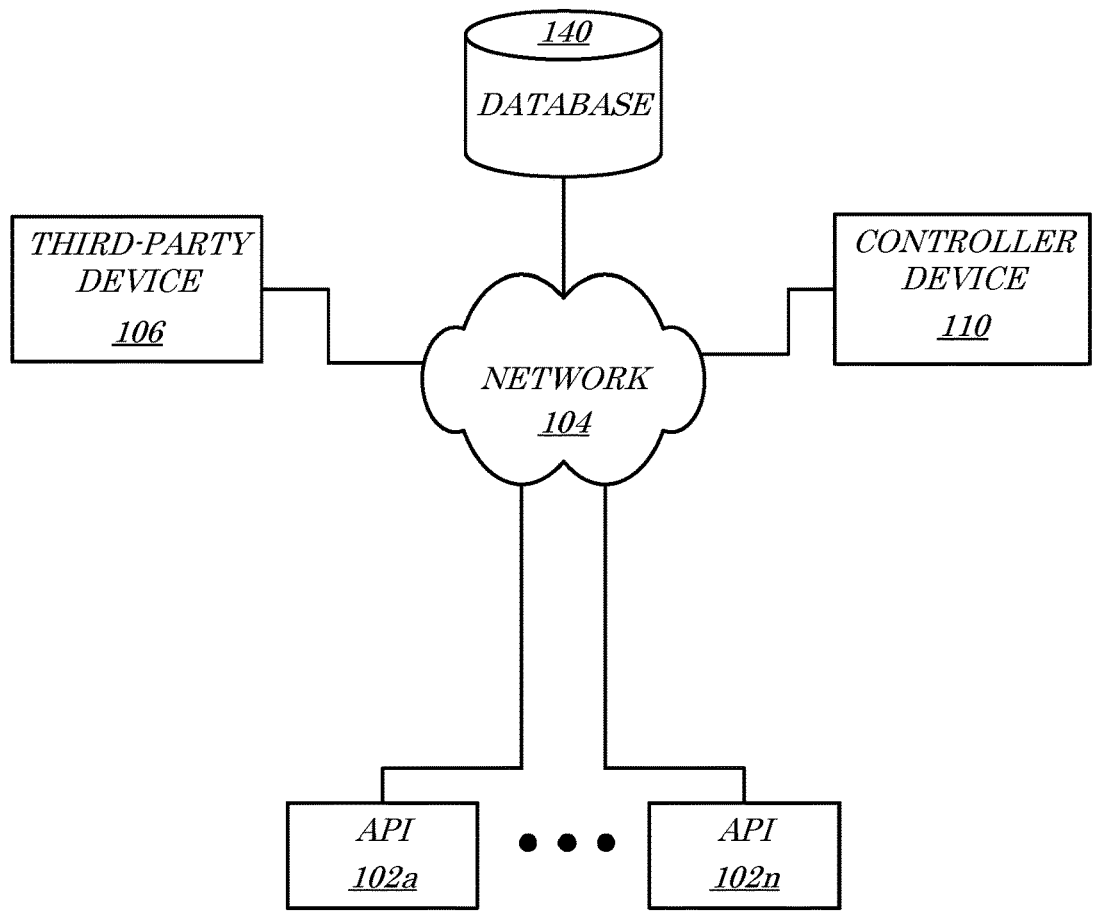
FIG. 1 is a block diagram of a system according to some embodiments.

There are various scenarios in which the implementation of technology ecosystems in complex computing environments requires substantial time and resources to accomplish and for which errors in implementation can be costly to resolve. Many software-driven computing environments across various industries rely on large numbers of software applications and extensive amounts of stored data, for example, in which any individual change may cause unintended consequences. The level of interdependency between software applications, procedures, engines, and stored data throughout the environment is often so complex that many personnel with specialized knowledge are required to coordinate and understand even simple system changes. In some cases, the interdependencies and/or relationships are so complex that the number of specialized personnel becomes too large to be practical and extensive testing and/or simulation is instead utilized—not to proactively avoid conflict or errors but in an attempt (e.g., trial and error) to identify affected system elements based on simulated error results. In each case, even a small system change or update (e.g., changing a single interface element on a customer-facing interface) may often require extensive personnel resources, lengthy testing procedures, and/or significant overall cost.

Scenarios where such complexities may result in such increased costs and extensive time delays include, but are not limited to: (i) code migration projects (e.g., migrating an application from one environment to another), (ii) code change/update projects (e.g., changing application code to add/delete features and/or functionality), and/or (iii) data storage structure changes/updates (e.g., adding, removing, editing, database fields and/or parameters).

In accordance with embodiments herein, these and other deficiencies of previous solutions are remedied by providing systems, apparatus, methods, and articles of manufacture for application/data dependency and/or relationship identification, visualization, and/or management. In some embodiments, a plurality of dependency harvester applications/plugins may be utilized to automatically source dependency data that is then translated and/or converted into a standardized form that is utilized to generate and/or identify dependency relationships, e.g., across disparate computing platforms and/or environments. The results of these automatically-identified dependencies may then be utilized, for example, to provide an interface to project implementation personnel that can point out and/or quantify predicted errors. Such an automated dependency identification/harvesting system can dramatically reduce both personnel and time-to-implementation costs of projects implemented in a computing environment, particularly where the environment comprises a plurality of complex data and/or application interdependencies and/or relationships.

II. Application Dependency Identification, Visualization, and/or Management Systems Referring first to FIG. 1, a block diagram of a system 100 according to some embodiments is shown. In some embodiments, the system 100 may comprise a plurality of targets, environments, and/or environmental objects, such as Application Programming Interface (API) objects 102*a-n* in communication via or with a network 104. According to some embodiments, the system 100 may comprise a third-party device 106, and/or a controller device 110, e.g., any or all of which may be in communication with or via the network 104. In some embodiments, any or all of the devices/objects 102*a-n*, 106, 110 may comprise and/or be in communication with a memory device, data storage device, and/or database 140. According to some embodiments, communications between and/or within the devices/objects 102*a-n*, 106, 110,

140 of the system 100 may be utilized to (i) identify a plurality of relationships and/or dependencies between one or more of the API objects 102*a-n*, (ii) generate data descriptive of the relationships/dependencies in a format specific to the respective API object 102*a-n*, (iii) transform the data descriptive of the relationships/dependencies into a standardized format, (iv) store the data descriptive of the relationships/dependencies in the standardized format, (v) generate application dependency metadata by performing at least one of (a) aggregating portions of the stored data that are descriptive of an identical dependency and (b) creating a relationship between two or more portions of the data that share a common dependency, and/or (vi) output a graphical mapping of a set of the processed application dependency data.

Figure 4A:
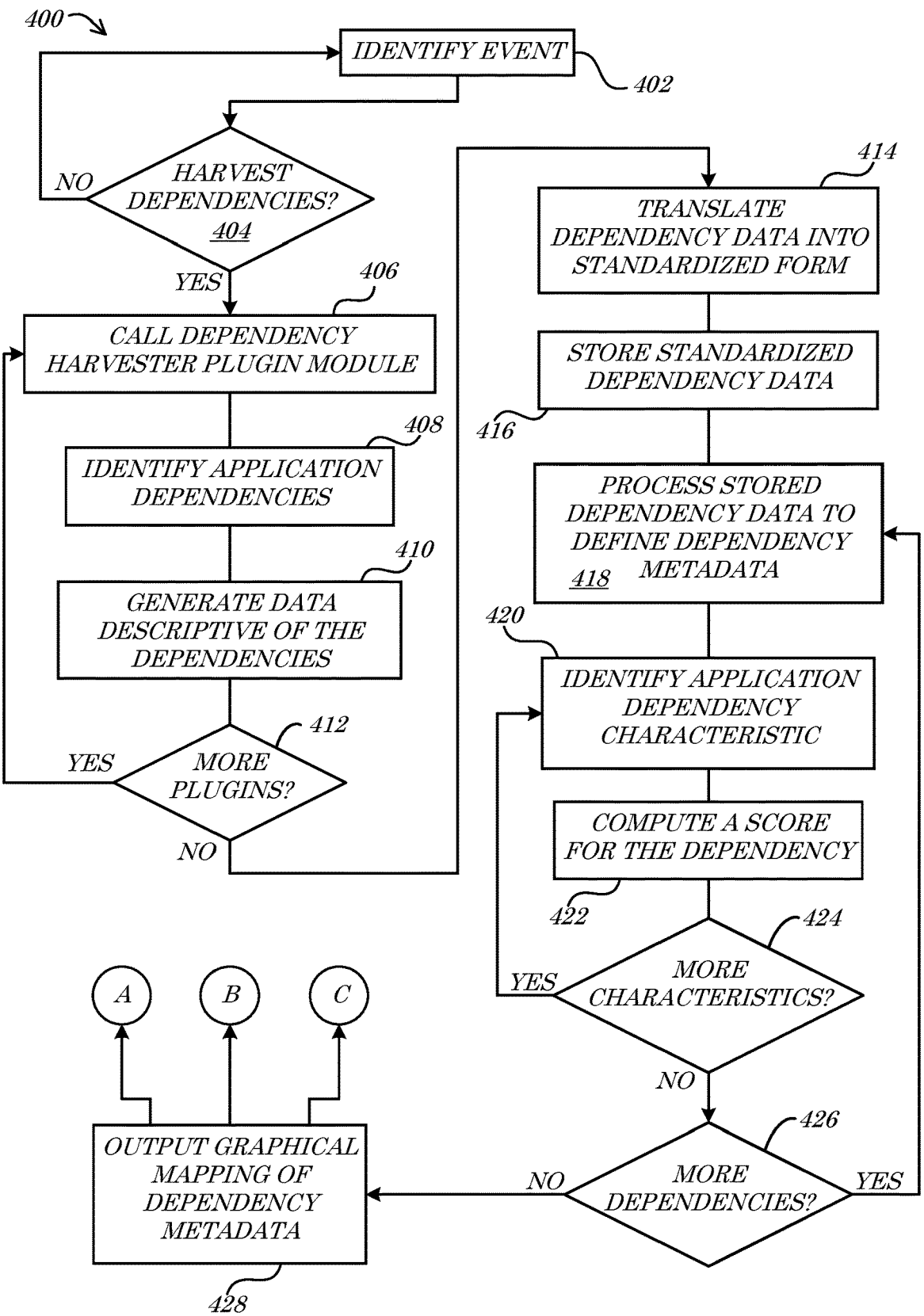
FIG. 4A and FIG. 4B are flow diagrams of a method according to some embodiments.

Fewer or more components 102*a-n*, 104, 106, 110, 140 and/or various configurations of the depicted components 102*a-n*, 104, 106, 110, 140 may be included in the system 100 without deviating from the scope of embodiments described herein. In some embodiments, the components 102*a-n*, 104, 106, 110, 140 may be similar in configuration and/or functionality to similarly named and/or numbered components as described herein. In some embodiments, the system 100 (and/or portions thereof) may comprise an application/data dependency and/or relationship identification, visualization, and/or management system and/or a platform programmed and/or otherwise configured to execute, conduct, and/or facilitate the method 400 of FIG. 4A and/or FIG. 4B herein, and/or portions thereof.

According to some embodiments, the API objects 102*a-n* may comprise any type or configuration of computing, mobile electronic, network, client, user, and/or communication environments, ecosystems, objects, programs, modules, engines, interfaces, data stores, and/or devices that are or become known or practicable. The API objects 102*a-n* may comprise, for example, one or more Platform as a Service (PaaS), code deployment, application development/deployment (e.g., Continuous Integration/Continuous Deployment (CI/CD)), data storage, code storage (e.g., a code repository), and/or Artificial Intelligence (AI) monitoring and/or analysis environments, ecosystems, and/or API instances. In some embodiments, the API objects 102*a-n* may comprise services, servers, databases, and/or cloud-based components and/or functionality, such as those provided by Pivotal Cloud Foundry (PCF) application PaaS available from Cloud Foundry, Inc. of San Francisco, CA, IBM® UrbanCode® application deployment tools available from the International Business Machines Corporation (IBM) of Armonk, NY, Jenkins CI/CD project development and deployment tools available online from the Jenkins Project Authors (https://www.jenkins.io), Datahub extensible metadata platform available online from the DataHub Project Authors (https://datahubproject.io/), Dynatrace® OneAgent™, PurePath™, Smartscape™, Grail™, and/or Davis AI™, available form Dynatrace, Inc. of Waltham, MA, and/or GitHub® code repository services and/or applications available from GitHub, Inc. of San Francisco, CA. In some embodiments, the API objects 102*a-n* may comprise one or more software-driven ecosystems or environments in which various applications, code, interfaces (and/or interface elements), and/or data reside and/or are utilized. In some embodiments, the API objects 102*a-n* may communicate with the controller device 110 either directly or via the network 104 via one or more proprietary and/or API-specific data communication contracts (not separately shown). According to some embodiments, each API object 102*a-n* may comprise and/or define one or more API interfaces, languages, procedures, and/or conventions or formats that may, for example, be unique to the environment/ecosystem of the particular API object 102*a-n*.

The network 104 may, according to some embodiments, comprise a Local Area Network (LAN; wireless and/or wired), cellular telephone, Bluetooth®, Near Field Communication (NFC), and/or Radio Frequency (RF) network with communication links between the controller device 110, the API objects 102*a-n*, the third-party device 106, and/or the memory device 140. In some embodiments, the network 104 may comprise direct communication links between any or all of the components 102*a-n*, 106, 110, 140 of the system 100. The API objects 102*a-n* may, for example, be directly interfaced or connected to one or more of the controller device 110 and/or the third-party device 106 via one or more wires, cables, wireless links, and/or other network components, such network components (e.g., communication links) comprising portions of the network 104. In some embodiments, the network 104 may comprise one or many other links or network components other than those depicted in FIG. 1. The controller device 110 may, for example, be connected to one or more of the API objects 102*a-n* via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a-n*, 106, 110, 140 of the system 100. The network 104 may comprise one or more cellular telephone networks with communication links between the API objects 102*a-n* and the third-party device 106 and/or the controller device 110, for example, and/or may comprise an NFC or other short-range wireless communication path, with communication links between various API objects 102*a-n*, for example.

According to some embodiments, the third-party device 106 may comprise any type or configuration of a computerized processing device, such as a PC, laptop computer, computer server, database system, and/or other electronic device, devices (e.g., network and/or user devices), or any combination thereof. In some embodiments, the third-party device 106 may be owned and/or operated by a third party (i.e., an entity different than any entity owning and/or operating either the API objects 102*a-n* or the controller device 110; such as a code development, code deployment, certificate, authentication, data storage, demographic, graphical element, and/or cryptographic service provider, and/or a user of a user device). The third-party device 106 may comprise, for example, a server via which cloud-based services, such as AI processing and/or code development and/or deployment services, are provided to the controller device 110 and/or the API objects 102*a-n* (and/or via one or more of the API objects 102*a-n*). According to some embodiments, the third-party device 106 may comprise a plurality of devices (e.g., sensors and/or computing devices) and/or may be associated with a plurality of third-party entities. In some embodiments, the third-party device 106 may comprise the memory device 140 (or a portion thereof), such as in the case the third-party device 106 comprises a third-party data storage service, device, and/or system, such as the Amazon® Simple Storage Service (Amazon® S3™)

available from Amazon.com, Inc. of Seattle, WA or an open-source third-party database service, such as MongoDB™ available from MongoDB, Inc. of New York, NY.

In some embodiments, the controller device 110 may comprise an electronic and/or computerized controller device, such as a computer server and/or server cluster communicatively coupled to interface with the API objects 102*a*-*n* and/or the third-party device 106 (directly and/or indirectly). The controller device 110 may, for example, comprise one or more PowerEdge™ M910 blade servers manufactured by Dell®, Inc. of Round Rock, TX, which may include one or more Eight-Core Intel® Xeon® 7500 Series electronic processing devices. According to some embodiments, the controller device 110 may be located remotely from one or more of the API objects 102*a*-*n* and/or the third-party device 106. The controller device 110 may also or alternatively comprise a plurality of electronic processing devices located at one or more various sites and/or locations (e.g., a distributed computing and/or processing network).

According to some embodiments, the controller device 110 may store and/or execute specially programmed instructions (not separately shown in FIG. 1) to operate in accordance with embodiments described herein. The controller device 110 may, for example, execute one or more programs, modules, and/or routines that automatically provide application/data dependency and/or relationship identification, visualization, and/or management functionality, as described herein. According to some embodiments, the controller device 110 may execute stored instructions, logic, and/or software modules to (i) identify a plurality of relationships and/or dependencies between one or more of the API objects 102*a*-*n*, (ii) generate data descriptive of the relationships/dependencies in a format specific to the respective API object 102*a*-*n* (and/or associated third-party device 106), (iii) translate and/or convert the data descriptive of the relationships/dependencies into a standardized format, (iv) store the data descriptive of the relationships/dependencies in the standardized format (e.g., in the database 140), (v) generate application dependency metadata by performing at least one of (a) aggregating portions of the stored data that are descriptive of an identical dependency and (b) creating a relationship between two or more portions of the data that share a common dependency, and/or (vi) output a graphical mapping of a set of the processed application dependency data.

In some embodiments, the API objects 102*a*-*n*, the third-party device 106, and/or the controller device 110 may be in communication with and/or comprise the memory device 140. The memory device 140 may comprise, for example, various databases and/or data storage mediums that may store, for example, API data, relationship data, dependency data, GUI element data, AI rules and/or data, visualization rules and/or data, relationship/dependency scoring and/or health evaluation rules and/or data, cryptographic keys and/or data, login and/or identity credentials, and/or instructions (e.g., API/data dependency/relationship harvesting instructions, dependency/relationship transformation and/or evaluation instructions, and/or AI training instructions) that cause various devices (e.g., the controller device 110, the third-party device 106, and/or the API objects 102*a*-*n*) to operate in accordance with embodiments described herein.

In some embodiments, the memory device 140 may comprise any type, configuration, and/or quantity of data storage devices that are or become known or practicable. The memory device 140 may, for example, comprise an array of optical and/or solid-state hard drives configured to store API/data dependency/relationship data, code structure data, and/or AI model data (e.g., analysis formulas and/or mathematical models), credentialing instructions and/or keys, and/or various operating instructions, drivers, etc. In some embodiments, the memory device 140 may comprise a solid-state and/or non-volatile memory card (e.g., a Secure Digital (SD) card, such as an SD Standard-Capacity (SDSC), an SD High-Capacity (SDHC), and/or an SD eXtended-Capacity (SDXC) and any various practicable form factors, such as original, mini, and micro sizes, available from Western Digital Corporation of San Jose, CA. While the memory device 140 is depicted as a stand-alone component of the controller device 110, the memory device 140 may comprise multiple components. In some embodiments, a multi-component memory device 140 may be distributed across various devices and/or may comprise remotely dispersed components. Any or all of the API objects 102*a*-*n*, the third-party device 106, and/or the controller device 110 may comprise the memory device 140 or a portion thereof, for example.

Figure 2:
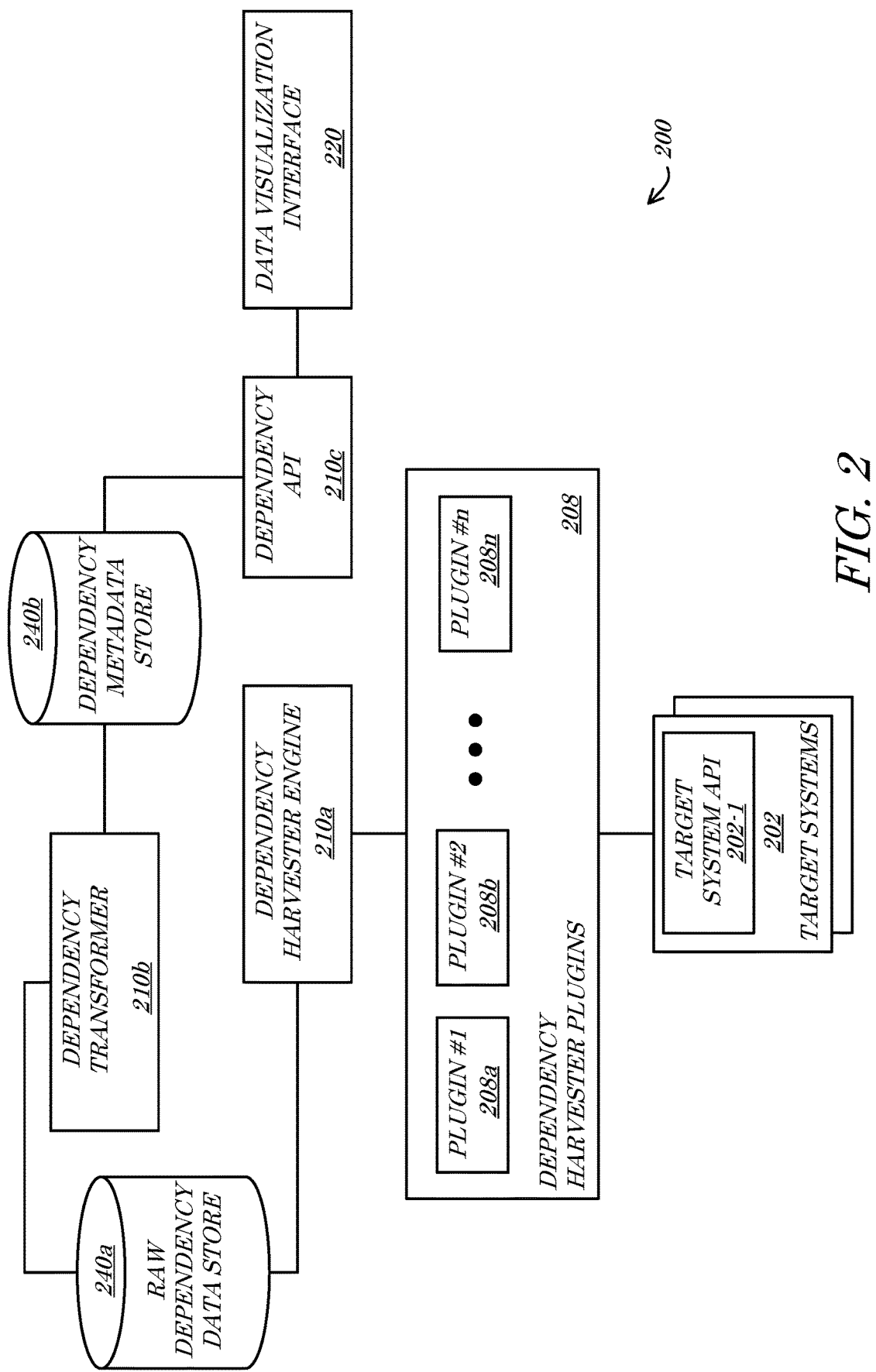
FIG. 2 is a block diagram of a system according to some embodiments.

Turning to FIG. 2, a block diagram of a system 200 according to some embodiments, is shown. In some embodiments, the system 200 may comprise a system that enables application/data dependency and/or relationship identification, visualization, and/or management functionality. The system 200 may comprise, for example, one or more target systems 202 (or "subsystems"; e.g., comprising one or more target system API objects 202-1) in communication with a suite of dependency harvester plugins 208 (e.g., a first plugin 208*a*, second plugin 208*b*, through "n"-th plugin 208*n*). In some embodiments, the suite of dependency harvester plugins 208 may be in communication with and/or the system 200 may comprise one or more processing devices, servers, and/or controllers, such as a first controller or dependency harvester engine 210*a*, a second controller or dependency transformer 210*b*, and/or a third controller or dependency API 210*c*. According to some embodiments, the system 200 may comprise (and/or generate and/or output) a data visualization interface 220, e.g., defined by the dependency API 210*c*. In some embodiments, the system 200 may comprise one or more memory devices 240*a*-*b*, such as a first memory device or raw dependency data store 240*a* and/or a second memory device or dependency metadata store 240*b*.

According to some embodiments, the system 200 may comprise a system configured (e.g., physically and/or communicatively structured and/or coupled, and/or programmed) to automatically provide application/data dependency and/or relationship identification, visualization, and/or management functionality, e.g., to one or more users (not separately depicted). The system 200 may, for example, be configured and/or coupled to automatically connect the dependency harvester plugins 208 with the one or more target systems 202 and/or target system API objects 202-1 thereof to search for, query, identify, and/or otherwise determine (e.g., "harvest" or "mine") dependency data therefrom. Within the target system(s) 202, for example, one or more applications and/or data elements may reside and/or be executed with such applications/data elements defining and/or comprising one or more application and/or data dependencies and/or relationships. In some embodiments, the target system API object 202-1 may comprise a software application, tool, language, and/or protocol native to the target system(s) 202 and via which dependency/relationship information may be identified and/or retrieved.

According to some embodiments, the dependency harvester plugins 208 may automatically communicate with the target system API object 202-1 (and/or the target system 202) to "harvest" or "mine" dependency/relationship data based on one or more triggering events and/or rules. The dependency harvester plugins 208 (or a particular dependency harvester plugin 208, such as the first plugin 208*a*) may query, call, and/or invoke the target system API object 202-1, for example, periodically (e.g., every hour, day, week, and/or as a "micro-batch"), based on a schedule (e.g., hourly between one (1) and four (4) AM, and/or based on triggering events. According to some embodiments, the dependency harvester plugins 208 (or a particular dependency harvester plugin 208, such as the first plugin 208*a*) may monitor, capture, and/or "listen" to events and/or data change events associated with (e.g., conducted by) the target system API object 202-1, compare identified event and/or data parameters (e.g., updated data flags) to stored rules and/or criteria, and determine whether (e.g., based on an occurrence of a match and/or in-range reading) harvesting should be triggered based on the identified event. In the case that a triggering event is identified, the dependency harvester plugins 208 may query the target system API object 202-1 to update, identify, retrieve, query, and/or otherwise obtain dependency/relationship data. According to some embodiments, harvesting may occur in either a synchronous or asynchronous manner.

In some embodiments, the dependency harvester plugins 208 may conduct communications and/or data retrieval operations with the target system 202 (and/or the target system API object 202-1) in accordance with one or more pre-defined "contracts" (e.g., "first" contracts; not separately shown) that define one or more data formats, syntax, communication protocols, and/or other formats and/or structures governing the communications/query and/or the data retrieved thereby. According to some embodiments, the one or more data formats, syntax, communication protocols, and/or other formats and/or structures defined by a particular contract may be specific, proprietary, and/or unique to the particular target system 202 (and/or the target system API object 202-1). In such a manner, for example, dependency/relationship data retrieved and/or identified by the dependency harvester plugins 208 may exist in a variety of disparate formats and/or structures and/or may be provided within differing syntax and/or protocol constraints.

According to some embodiments, such dependency/relationship data may be provided (e.g., by the dependency harvester plugins 208) to the dependency harvester engine 210*a* in accordance with a "second" contract that defines one or more data formats, syntax, communication protocols, and/or other formats and/or structures governing communications between the dependency harvester engine 210*a* and the dependency harvester plugins 208 and/or governing aspects and/or characteristics of the provided data. The dependency/relationship data may be translated and/or converted by the respective dependency harvester plugin 208 that acquired the data, for example, and transmitted to the dependency harvester engine 210*a* in accordance with the second contract. In some embodiments, the dependency/relationship data may be transmitted to and/or received by the dependency harvester engine 210*a*, which may process (e.g., utilizing one or more processing devices; not separately shown) the dependency/relationship data utilizing one or more algorithms (e.g., instruction sets, modules, protocols, and/or programmatic engines) to translate and/or convert the dependency/relationship data into a standardized format. According to some embodiments, the dependency harvester engine 210*a* may standardize any or all dependency/relationship data received from each of the dependency harvester plugins 208 and store the standardized data in the raw dependency data store 240*a*. In such a manner, for example, the raw dependency data store 240*a* may be automatically loaded with an array of standardized data defining a plurality of application and/or data dependencies and/or relationships mined or harvested from a plurality of disparate target systems 202.

In some embodiments, the dependency transformer 210*b* may query and/or retrieve the stored and standardized dependency/relationship data from the raw dependency data store 240*a* and may utilize one or more algorithms (e.g., instruction sets, modules, protocols, and/or programmatic engines) to process the dependency/relationship data. The dependency transformer 210*b* may, for example, aggregate, de-duplicate, pivot, compress, append, parse, and/or mathematically and/or logically process the "raw" standardized dependency/relationship data to define one or more "metadata" elements or processed or transformed data that is stored, e.g., in the dependency metadata store 240*b*. According to some embodiments, the dependency transformer 210*b* may execute stored instructions that identify and/or define one or more metrics (e.g., "metadata") descriptive of one or more relationships and/or dependencies (e.g., of the target system(s) 202) described and/or represented by the data stored in the raw dependency data store 240*a*. The dependency transformer 210*b* may, for example, (i) aggregate portions of the stored "raw" data that are descriptive of an identical dependency/relationship and/or (ii) create a relationship between two or more portions of the "raw" data that share a common dependency/relationship.

According to some embodiments, the dependency transformer 210*b* may also or alternatively compute a score and/or health metric for at least one of the dependencies/relationships. The dependency transformer 210*b* may, for example, compute, identify, and/or derive one or more mathematical and/or logical parameters descriptive of a relationship/dependency and compute a score for the relationship/dependency based on the one or more mathematical and/or logical parameters (e.g., values thereof). In some embodiments, different values ranges for the one or more mathematical and/or logical parameters may be assigned different scores or values and the individual scores/values may be utilized to calculate a total score for the relationship/dependency (e.g., summation, averaging, maximum, minimum, and/or other statistical and/or comparative mathematical metrics). According to some embodiments, one or more scores, ranks, standings, and/or results (e.g., derived from the one or more mathematical and/or logical parameters) may be utilized to define scoring data for each of a plurality of relationships/dependencies and the relationship/dependency with the highest (or lowest) score may be ranked first (and/or may be indicated as a winner in competitive relationship/dependency evaluation scenario embodiments). According to some embodiments, any relationship/dependency that is scored above a predetermined threshold value may be indicated as having achieved a particular qualitative ranking or label such as, e.g., "healthy", "critical path", "low priority", "broken", etc. According to some embodiments, any or all metrics, scores, rankings, etc., may be stored (e.g., by the dependency transformer 210*b*) in the dependency metadata store 240*b*.

In some embodiments, the dependency API 210*c* may comprise and/or implement instructions that provide access and/or functional utilization of the data stored in the dependency metadata store 240*b*. The dependency API 210*c* may comprise and/or execute, for example, dependency visualization interface rules that cause the generation, definition, and/or outputting of the data visualization interface 220. In some embodiments, the data visualization interface 220 may comprise a graphical mapping of a set of the processed application/data dependency data. The dependency API 210*c* may, for example, utilize a subset of data stored in the dependency metadata store 240*b* to identify, assemble, retrieve, generate, and/or output one or more interface elements via (and/or as) the data visualization interface 220. According to some embodiments, the outputting of the set and/or subset of the processed application/data dependency data may be conducted by the dependency API 210*c* in response to input entered via and/or received from the data visualization interface 220. The data visualization interface 220 may be utilized by a user (not shown), such as code development and/or deployment personnel, for example, to selectively and/or automatically access and/or utilize the data stored in the dependency metadata store 240*b*, e.g., in accordance with and/or in furtherance of various use cases as described herein, such as, but not limited to, (i) code migration validation, (ii) ecosystem change/update evaluations, (iii) system architecture and/or vitality analysis, and/or (iv) critical path analysis. In some embodiments, the dependency API 210*c* may receive input via the data visualization interface 220 and may produce and provide contextually-generated output via the data visualization interface 220 (e.g., via a display screen of a user device not shown) to conduct application and/or data dependency and/or relationship analysis based on automatically harvested and/or processed dependency/relationship data (e.g., for the target system(s) 202) as described herein. In some embodiments, the dependency API 210*c* may also or alternatively be initiated by, called by, and/or provide output for one or more other interfaces, modules, and/or devices (not shown).

Fewer or more components 202, 202-1, 208, 208*a-n*, 210*a-c*, 220, 240*a-b* and/or various configurations of the depicted components 202, 202-1, 208, 208*a-n*, 210*a-c*, 220, 240*a-b* may be included in the system 200 without deviating from the scope of embodiments described herein. In some embodiments, the components 202, 202-1, 208, 208*a-n*, 210*a-c*, 220, 240*a-b* may be similar in configuration and/or functionality to similarly named and/or numbered components as described herein. In some embodiments, the system 200 (and/or portions thereof) may comprise an application/data dependency and/or relationship identification, visualization, and/or management system and/or a platform programmed and/or otherwise configured to execute, conduct, and/or facilitate the method 400 of FIG. 4A and/or FIG. 4B herein, and/or portions thereof.

Figure 3:
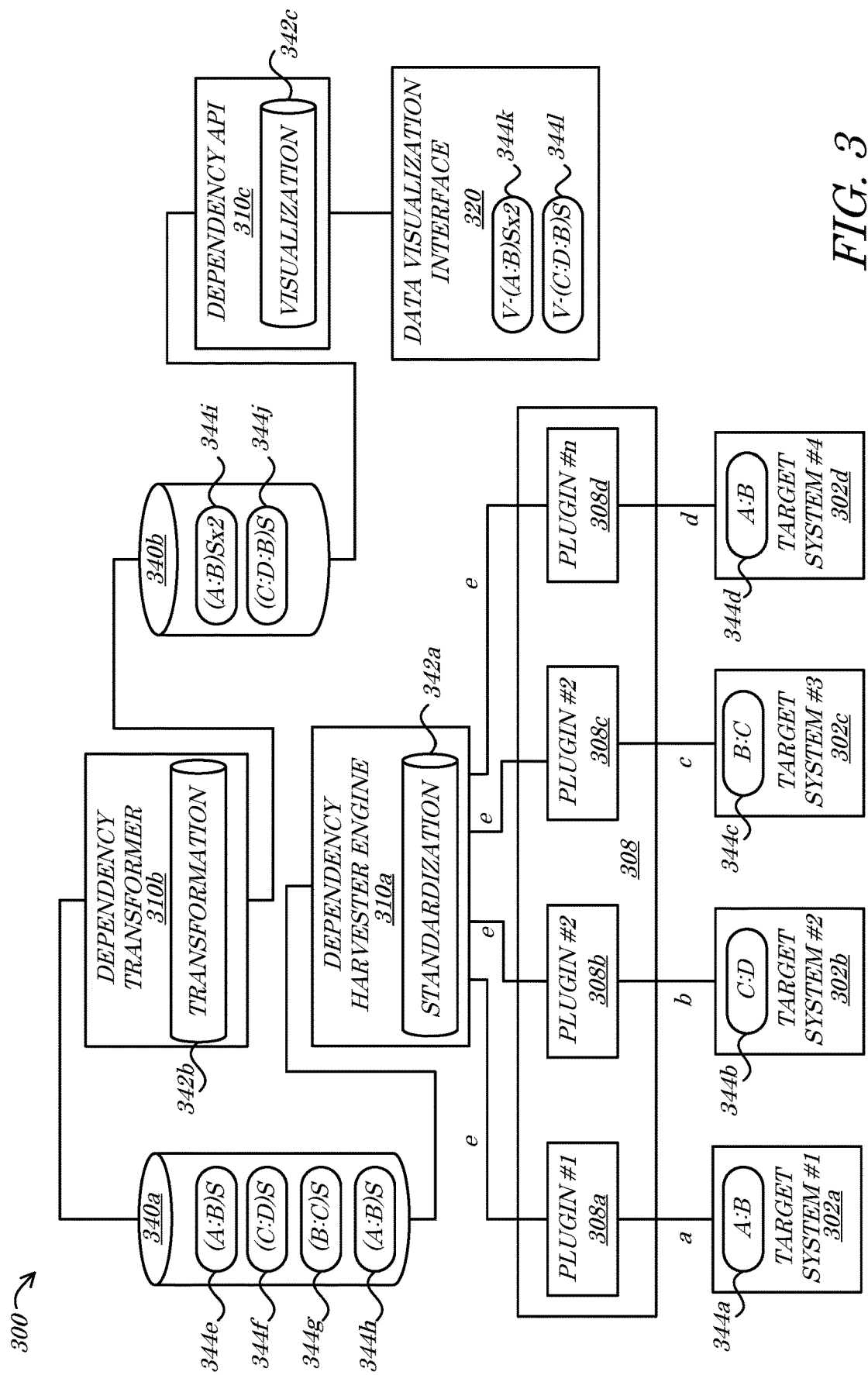
FIG. 3 is a block diagram of a system according to some embodiments.

Referring now to FIG. 3, a block diagram of a system 300 according to some embodiments, is shown. In some embodiments, the system 300 may comprise a system that enables application/data dependency and/or relationship identification, visualization, and/or management functionality. The system 300 may comprise, for example, a plurality of subsystems, environments, or "target" systems 302*a-d* (e.g., a first target system 302*a*, a second target system 302*b*, a third target system 302*c*, and/or a fourth target system 302*d*) in communication with dependency harvester plugins 308. As depicted, in some embodiments the system 300 may comprise a dedicated dependency harvester plugin 308*a-d* (e.g., a first plugin 308*a*, a second plugin 308*b*, a third plugin 308*c*, and/or a fourth plugin 308*d*) for each of the target systems 302*a-d*. In some embodiments, each dedicated dependency harvester plugin 308*a-n* may be in communication with and/or coupled to a respective target system 302*a-d* via and/or in accordance with a dedicated, specific, and/or unique contract, "a", "b", "c", and "d". The dedicated contracts "a", "b", "c", and "d" may define and/or govern, for example, communications and/or data formatting protocols specific to the respective target systems 302*a-d*.

According to some embodiments, the dedicated dependency harvester plugins 308*a-d* may be in communication with and/or the system 300 may comprise one or more processing devices, servers, and/or controllers, such as a first controller or dependency harvester engine 310*a* (e.g., comprising and/or executing a first program or standardization instructions 342*a*), a second controller or dependency transformer 310*b* (e.g., comprising and/or executing a second program or transformation instructions 342*b*), and/or a third controller or dependency API 310*c* (e.g., comprising and/or executing a third program or visualization instructions 342*c*). In some embodiments, the dedicated dependency harvester plugins 308*a-d* may be in communication with and/or coupled to the dependency harvester engine 310*a* via and/or in accordance with a common contract, "e". The common contract "e" may define and/or govern, for example, communications and/or data formatting protocols specific to the dependency harvester engine 310*a*, such as a standardized data format, protocol, etc. The common contract "e" may, for example, define one or more translation and/or conversion rules, protocols, filters, and/or models or formulas that convert and/or translate information received from the dedicated dependency harvester plugins 308*a-d* into a standardized format.

In some embodiments, the system 300 may comprise (and/or generate and/or output) a data visualization interface 320, e.g., defined by the dependency API 310*c*. In some embodiments, the system 300 may comprise one or more memory devices 340*a-b*, such as a first memory device or database 340*a* and/or a second memory device or database 340*b*. According to some embodiments, the system 300 may comprise a system configured (e.g., physically and/or communicatively structured and/or coupled, and/or programmed) to automatically provide application/data dependency and/or relationship identification, visualization, and/or management functionality, e.g., to one or more users (not separately depicted). The system 300 may, for example, be configured and/or coupled to automatically interface the dedicated dependency harvester plugins 308*a-d* with the respective target systems 302*a-d* to search for, query, identify, and/or otherwise determine (e.g., "harvest" or "mine") dependency data 344*a-d* therefrom. Within the target systems 302*a-d*, for example, one or more applications and/or data elements may reside and/or be executed with such applications/data elements defining and/or comprising one or more application and/or data dependencies and/or relationships, such as a first relationship/dependency "A: B" 344*a* in the first target system 302*a*, a second relationship/dependency "C: D" 344*b* in the second target system 302*a*, a third relationship/dependency "B: C" 344*c* in the third target system 302*c*, and/or a fourth relationship/dependency "A: B" 344*d* in the fourth target system 302*d*. The first relationship "A: B" 344*a* may define and/or comprise information descriptive of a relationship/dependency between a first application, API, and/or data element "A" and a second application, API, and/or data element "B", for example, the second relationship "C: D" 344*b* may define and/or comprise information descriptive of a relationship/dependency between a third application, API, and/or data element "C" and a fourth application, API, and/or data element "D", and so on. In some embodiments, one or more API objects, software applications, tools, languages, and/or protocols (not separately shown) native to the target systems 302*a-d* may be utilized by the dedicated dependency harvester plugins 308*a-d* to harvest and/or mine dependency/relationship information, e.g., the relationship data 344*a-d*.

According to some embodiments, the relationship data 344*a-d* may be harvested by the dedicated dependency harvester plugins 308*a-d* from the respective target systems 302*a-d*, e.g., in response to a triggering event, in accordance with a schedule, etc. In accordance with the dedicated contracts "a", "b", "c", and "d", the relationship data 344*a-d* may be acquired and/or retrieved or received in varying formats and then transmitted to (and/or received by) the dependency harvester engine 310*a* in accordance with the common contract "e" (e.g., that may translate and/or convert, edit, reformat, and/or otherwise standardize the relationship data 344*a-d*). The dependency harvester engine 310*a* may execute the standardization instructions 342*a*, for example, to convert and/or standardize the relationship data 344*a-d* to define standardized relationship data 344*e-h* (e.g., a first standardized relationship "(A: B) S" 344*e*, a second standardized relationship "(C: D) S" 344*f*, a third standardized relationship "(B: C) S" 344*g*, and/or a fourth standardized relationship "(A: B) S" 344*h*) that, e.g., is stored in the first database 340*a*. According to some embodiments, the standardized relationship data 344*e-h* may comprise "raw" data, e.g., that has not been aggregated, consolidated, and/or otherwise transformed except for being represented in the standardized format.

In some embodiments, the dependency transformer 310*b* may process some or all of the stored standardized (and/or raw) relationship data 344*e-h* to define one or more dependency metadata metrics and/or elements 344*i-j*. The dependency transformer 310*b* may execute the transformation instructions 342*b*, for example, to (i) query, identify, and/or load some or all of the standardized relationship data 344*e-h*, (ii) identify and/or compute one or more characteristics of one or more of the standardized relationship data 344*e-h* elements, (iii) compute a score for one or more of the standardized relationship data 344*e-h* elements, (iv) compute a health metric for one or more of the standardized relationship data 344*e-h* elements, (v) identify, detect, and/or predict one or more errors for one or more of the standardized relationship data 344*e-h* elements, (vi) identify standardized relationship data 344*e-h* elements that are descriptive of an identical relationship/dependency, (vii) create a relationship between standardized relationship data 344*e-h* elements that share a common relationship/dependency, (viii) identify missing historic dependencies, (ix) identify unnecessary and/or unwanted dependencies, and/or (x) identify invalid dependency items. In some embodiments, the dependency transformer 310*b* may analyze and/or process the standardized relationship data 344*e-h* to identify, compute, and/or calculate one or more of the characteristics, such as, but not limited to, a number of calls and/or messages associated with a particular standardized relationship data 344*e-h*, a number of errors (e.g., communication errors) associated with a particular standardized relationship data 344*e-h*, and/or a number of instances of a particular standardized relationship data 344*e-h*. With respect to the example standardized relationship data 344*e-h* in FIG. 3, for example, the dependency transformer 310*b* may identify (e.g., via an execution of the transformation instructions 342*b*) that the first standardized relationship "(A: B) S" 344*e* and the fourth standardized relationship "(A: B) S" 344*h* are identical and accordingly generate a first dependency metadata element "(A: B) Sx2" 344*i* that represents and/or quantifies the multiple occurrences of the same underlying relationship between "A" and "B" (e.g., from both the first target system 302*a* and the fourth target system 302*d*). The example standardized relationship data 344*e-h* in FIG. 3 may also or alternatively be utilized, for example, to create and/or quantify a relationship between "B", "C", and "D" as a second metadata element "(C: D: B) S" 344*j*, that represents the shared dependency/relationship between both "B" and "D" with respect to "C".

According to some embodiments, any or all characteristics, metrics, and/or other identified, calculated, and/or computed metadata 344*i-j* may be stored (e.g., by the dependency transformer 310*b*) in the second database 340*b*. The second database 340*b* may comprise, for example, a processed data store that is accessible for performing and/or visualizing analytics descriptive of the dependencies/relationships of the target systems 302*a-d*. The second database 340*b* may be in communication with the dependency API 310*c*, for example, that executes the visualization instructions 342*c* to generate, define, and/or output the data visualization interface 320. The data visualization interface 320 may be provided (e.g., output) to a user (not shown) for example, in response to a query or request received from the user in furtherance of one or more analysis projects for which the relationship data 344*a-d* may be pertinent. In some embodiments, the user may submit (and/or the dependency API 310*c* may receive) a request for the computed metadata 344*i-j* (and/or the relationship data 344*a-d*) and the dependency API 310*c* may serve, generate, define, and/or output (e.g., via an execution of the visualization instructions 342*c*) one or more data visualization elements 344*k-l* that represent the computed metadata 344*i-j*. In such a manner, for example, a user may provide one or more query parameters, such as an identification of a particular application (e.g., code, API), data element, ecosystem, and/or environment to be analyzed and receive, via output of the data visualization elements 344*k-l*, analysis results. Such results may include, for example, a graphical mapping of application and/or data dependencies, a comparison of relationships/dependencies in different environments and/or ecosystems, and/or scores and/or metrics (e.g., health metrics) descriptive of one or more relationships/dependencies.

Fewer or more components 302*a-d*, 308, 308*a-d*, 310*a-c*, 320, 340*a-b*, 342*a-c*, 344*a-l* and/or various configurations of the depicted components 302*a-d*, 308, 308*a-d*, 310*a-c*, 320, 340*a-b*, 342*a-c*, 344*a-l* may be included in the system 300 without deviating from the scope of embodiments described herein. In some embodiments, the components 302*a-d*, 308, 308*a-d*, 310*a-c*, 320, 340*a-b*, 342*a-c*, 344*a-l* may be similar in configuration and/or functionality to similarly named and/or numbered components as described herein. In some embodiments, the system 300 (and/or portions thereof) may comprise an application/data dependency and/or relationship identification, visualization, and/or management system and/or a platform programmed and/or otherwise configured to execute, conduct, and/or facilitate the method 400 of FIG. 4A and/or FIG. 4B herein, and/or portions thereof.

III. Application Dependency Identification, Visualization, And/Or Management Methods Referring now to FIG. 4A and FIG. 4B, flow diagrams of a method 400 according to some embodiments are shown. In some embodiments, the method 400 may be performed and/or implemented by and/or otherwise associated with one or more specialized and/or specially-programmed computers (e.g., one or more of the third-party device 106, the controller devices 110, 210*a-c*, 310*a-c* and/or the apparatus 710 of FIG. 1, FIG. 2, FIG. 3, and/or FIG. 7 herein), computer terminals, computer servers, computer systems and/or networks, and/or any combinations thereof (e.g., by one or more multi-threaded and/or multi-core processing units of an application/data dependency and/or relationship identification, visualization, and/or management system). In some embodiments, the method 400 may be embodied in, facilitated by, and/or otherwise associated with various input mechanisms and/or interfaces (such as the interfaces 220, 320, 520*a-b*, 620*a-b*, 720 of FIG. 2, FIG. 3, FIG. 5A, FIG. 5B, FIG. 6A, FIG. 6B, and/or FIG. 7 herein).

Figure 7:
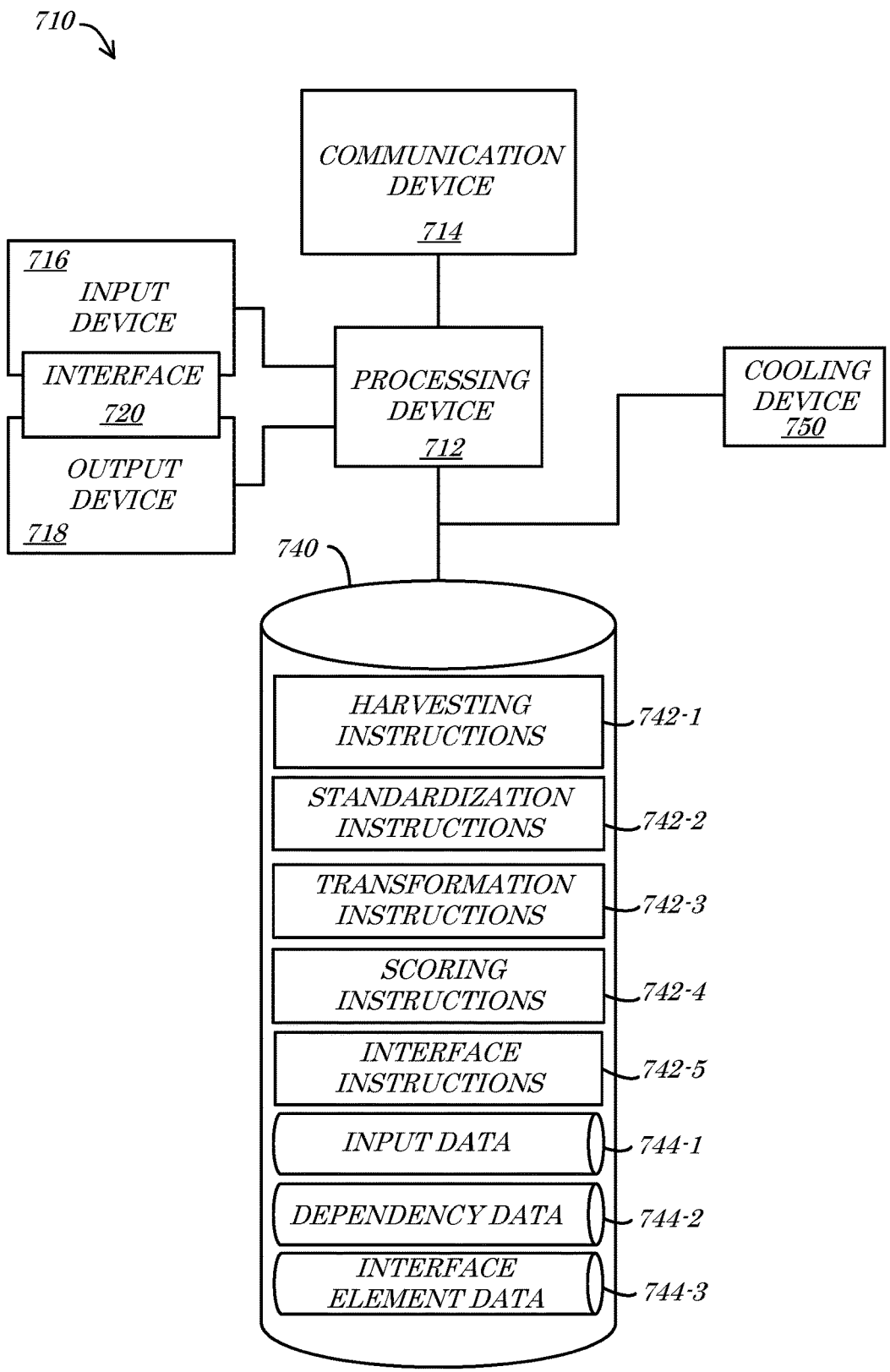
FIG. 7 is a block diagram of an apparatus according to some embodiments.
Figure 8A:
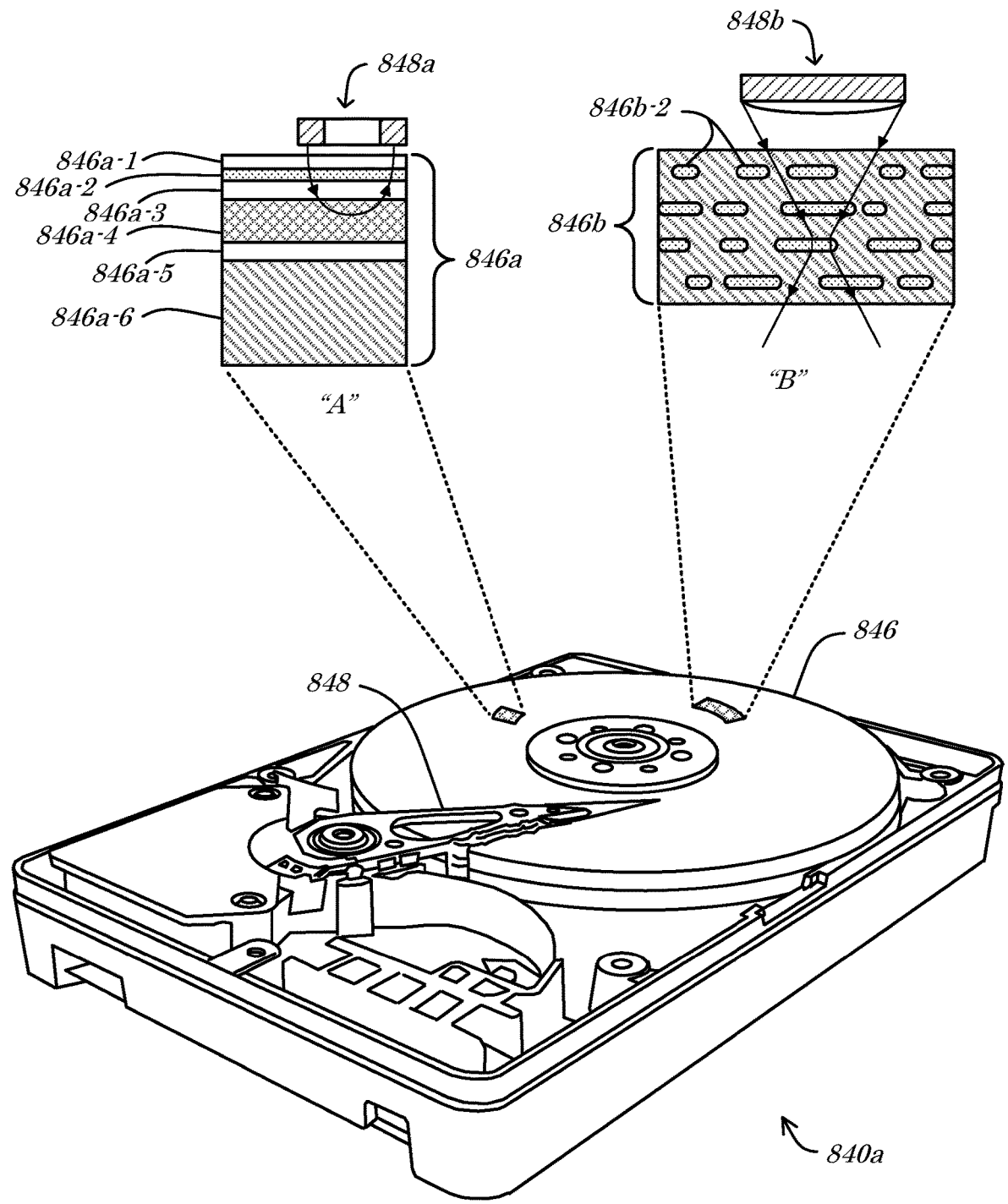
FIG. 8A, FIG. 8B, FIG. 8C, FIG. 8D, and FIG. 8E are perspective diagrams of exemplary data storage devices according to some embodiments.
Figure 8B:
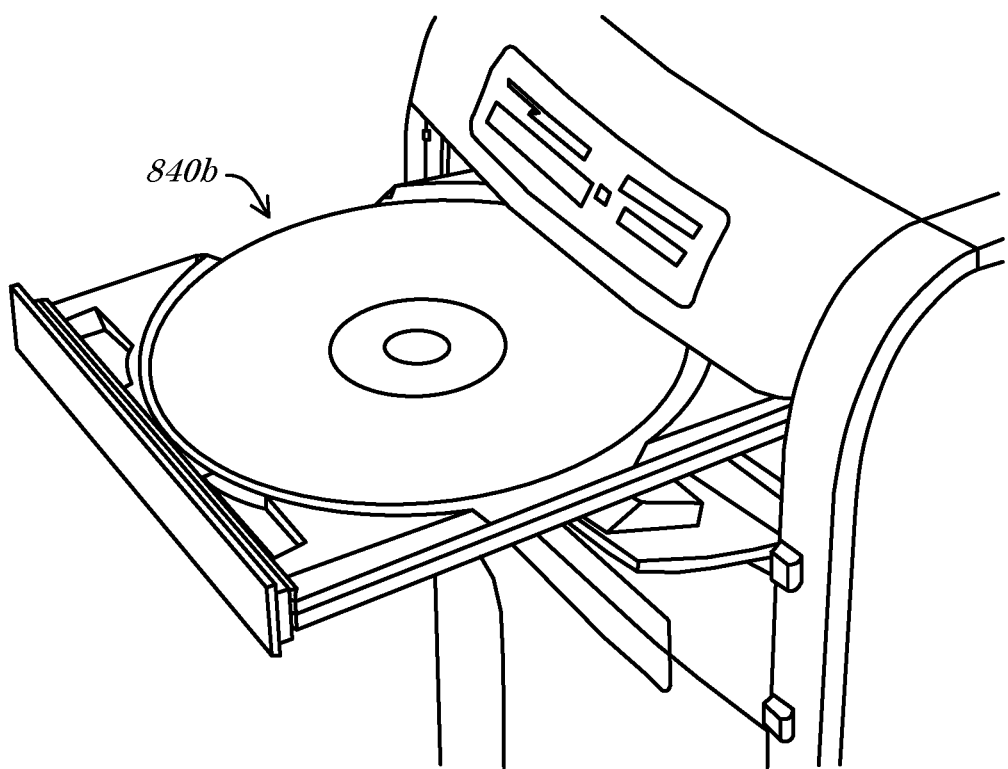
Figure 8C:
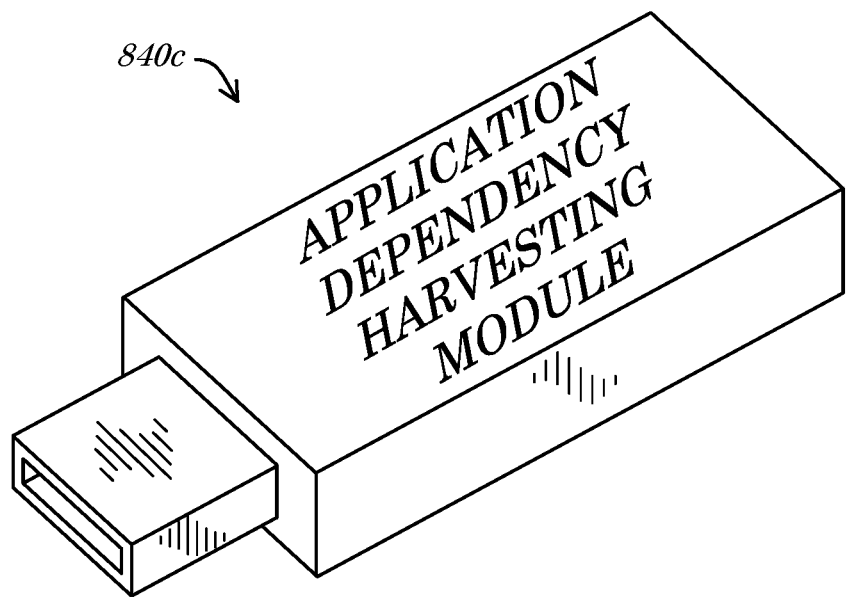
Figure 8D:
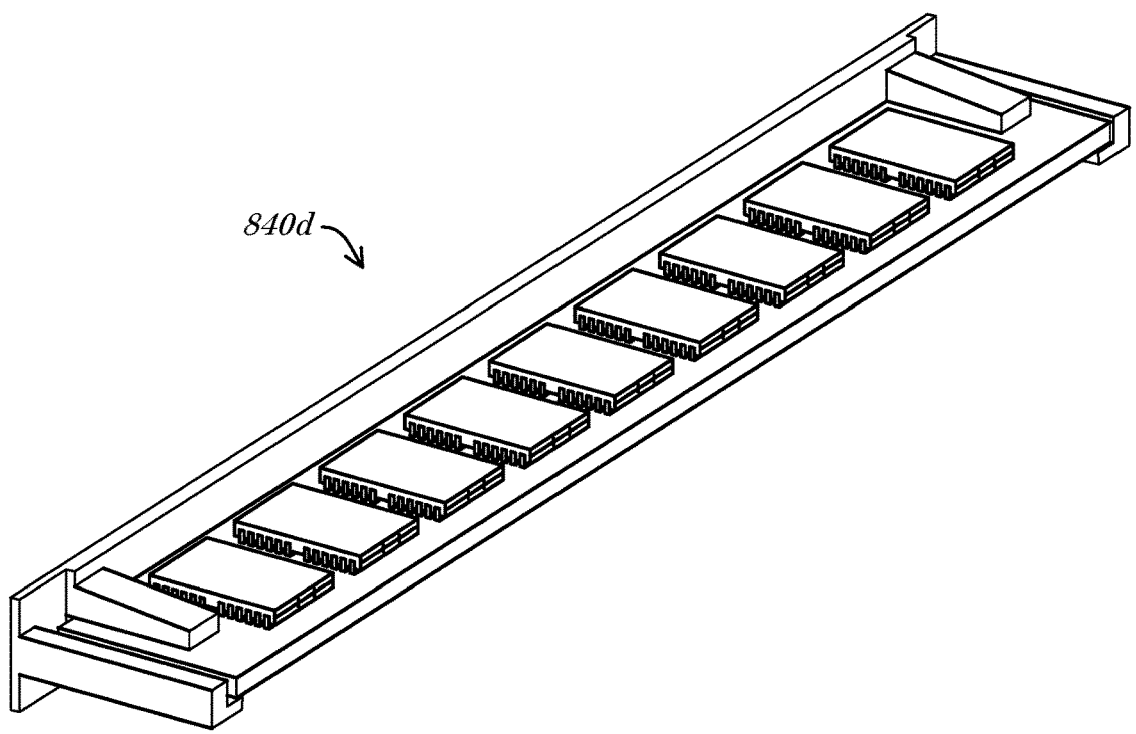
Figure 8E:
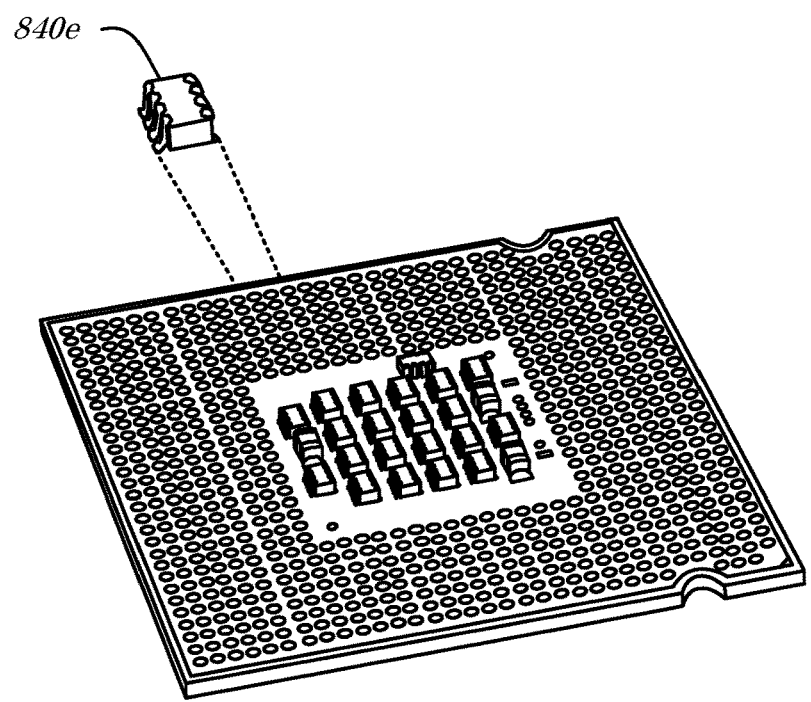

The process diagrams and flow diagrams described herein do not necessarily imply a fixed order to any depicted actions, steps, and/or procedures, and embodiments may generally be performed in any order that is practicable unless otherwise and specifically noted. Different depicted actions, steps, and/or procedures may be performed, unless specifically noted otherwise, in parallel or in series. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 240*a-b*, 340*a-b*, 740, 840*a-e* of FIG. 1, FIG. 2, FIG. 3, FIG. 7, FIG. 8A, FIG. 8B, FIG. 8C, FIG. 8D, and/or FIG. 8E herein) may store thereon instructions that when executed by a machine (such as a computerized processor and/or electronic processing device) result in performance according to any one or more of the embodiments described herein.

In some embodiments, the method 400 may operate upon and/or be triggered by an identification and/or receipt of user-defined input from a remote and/or mobile user device (not shown) as part of a code migration, system architecture, and/or critical path analysis. The method 400 may initiate, with respect to a non-limiting example of an API migration validation process, for example, upon receiving an indication of an API to be analyzed. Other input and/or event data may also or alternatively be received (e.g., from the user and/or from other sources) and/or identified, at 402.

According to some embodiments, the method may comprise determining whether to harvest/mine dependencies/relationships, at 404. Input and/or received data identified (e.g., at 402) may be compared to stored thresholds and/or criteria, for example, to determine whether the identified event/data comprises a trigger for dependency/relationship data harvesting. The event/trigger may comprise, for example, an occurrence of a particular scheduled time, a passing of a particular period of time, a receipt of a particular type, quantity, and/or value of input (e.g., a command or request), etc. In some embodiments, a match between the event and stored data (e.g., a direct comparison match, an above or below threshold match, and/or a match of a value falling within a predetermined range of values) may indicate a trigger condition, while a lack of a match may indicate that a triggering event has not occurred. In the case that it is determined that a triggering event has not occurred, the method 400 may continue, proceed back to, and/or comprise identifying an event, at 402. The method 400 may, for example, "listen" for and/or otherwise monitor one or more event and/or input sources to identify event occurrences, e.g., until a triggering event is identified, at 404.

In some embodiments, such as in the case that a triggering event is identified at 404, the method 400 may comprise and/or continue to call one or more dependency/relationship harvester plugin modules, at 406. An operational system performing the method 400 may comprise, for example, a suite of dependency/relationship harvester plugin modules that comprise APIs and/or other coded objects or modules specifically configured to harvest/mine dependency/relationship data from a plurality of distinct subsystems, environments, and/or ecosystems. Each dependency/relationship harvester plugin module may be programmed to interface with, access, interrogate, and/or otherwise communicate with a particular API, repository, data storage structure, data processing environment, etc., for example, and may be operable to extract and/or otherwise identify application and/or data dependency/relationship data therefrom. In some embodiments, dependency/relationship harvester plugin modules may be added and/or removed depending upon the content, quantity, type, and/or structure of the target systems. According to some embodiments, the application/data dependency and/or relationship identification, visualization, and/or management system may call, invoke, and/or initiate the dependency/relationship harvester plugin modules, e.g., based on and/or in response to the determination of a triggering event and/or condition, at 404. In some embodiments, based on the nature of the triggering event/input, only a subset of the dependency/relationship harvester plugin modules may be called, activated, and/or invoked.

According to some embodiments, the method 400 may comprise identifying (e.g., by one or more dependency/relationship harvester plugin modules) application and/or data dependencies and/or relationships, at 408. Each dependency/relationship harvester plugin module may, for example, query and/or otherwise interface with a respective target system and/or target system API to identify one or more application, API, data, and/or other dependencies and/or relationships within the computing environment. According to some embodiments, each dependency/relationship harvester plugin module may be coded to search specific locations and/or data elements within the respective target subsystem(s).

In some embodiments, the method 400 may comprise generating (e.g., by one or more dependency/relationship harvester plugin modules) data descriptive of the identified dependencies/relationships, at 410. Each dependency/relationship harvester plugin module may, for example, generate a data element, string, and/or object descriptive of any or all identified dependencies/relationships. According to some embodiments, such data may be formatted and/or generated in accordance with parameters defined by the target system(s) from which the dependency/relationship data has been harvested. Each dependency/relationship harvester plugin module may, for example, be communicatively coupled to a respective subsystem and/or API thereof via a dedicated, proprietary, and/or unique or distinct contract that defines various data and/or communications parameters with respect to the subsystem and/or target API thereof. In some embodiments, the method 400 may cycle through calling and/or activating each of a plurality of triggered plugins and may, for example, comprise determining whether more plugins should be called, activated, and/or interrogated, at 412. A listing of available, active, and/or triggered (e.g., based on the determination at 404) plugins may be consulted, for example, to identify any plugins that have not yet been called (and/or for which dependency/relationship data has not yet been acquired). In the case that not all plugins have been called and/or utilized, the method 400 may continue to and/or loop back to call one or more additional dependency/relationship harvester plugin modules, at 406.

According to some embodiments, such as in the case that it is determined (e.g., at 412) that all dependency/relationship harvester plugin modules have been called and/or utilized, the method 400 may continue to and/or comprise translating and/or converting the harvested dependency/relationship data into a standardized form, at 414. In some embodiments, each dependency/relationship harvester plugin module may be communicatively coupled to the system (and/or a portion and/or component thereof, such as a data harvesting and/or standardization engine and/or controller) in accordance with a common or standardized contract. In such a manner, for example, the dependency/relationship data harvested in various formats, structures, syntaxes, etc., from the various subsystems may be processed (e.g., in accordance with the standardized contract) to convert and/or translate the data into the standardized form. In some embodiments, the dependency/relationship harvester plugin modules may be programmed to conduct and/or facilitate the conversion and/or translation and/or the system may conduct the conversion/translation. The conversion/translation may comprise, for example, a programmed transposition, mapping, and/or decoding of the source dependency/relationship data to convert any or all received data into the standardized form. According to some embodiments, different mappings and/or algorithms may be utilized for data received from different subsystem data sources.

In some embodiments, the method 400 may comprise storing (e.g., by the data harvesting engine) the standardized dependency data, at 416. The standardized data may be stored, for example, in a first or "raw" dependency/relationship data store, such as a backend (e.g., non-production) database, data warehouse, etc. According to some embodiments, the method 400 may also or alternatively store the non-standardized data, e.g., for error tracking, auditing, and/or data staging purposes. In some embodiments, the dependency/relationship data may be stored in replacement of previous data for the subsystems or may be appended or added to any previously-harvested data. In such a manner, for example, the first database may store an ongoing historical record of subsystem dependencies/relationships.

According to some embodiments, the method 400 may comprise processing (e.g., by a data processing and/or transformation engine) the standardized (and/or non-standardized) dependency/relationship data to define dependency/relationship metadata, at 418. In some embodiments, the processing may comprise an analysis of the standardized dependency/relationship data that identifies and/or parses various attributes of the data. According to some embodiments for example, the processing may comprise (i) aggregating portions of the stored/standardized data that are descriptive of an identical dependency and/or (ii) creating a relationship between two or more portions of the data that share a common dependency. The data may be searched, for example, to identify each occurrence of a particular dependency and/or relationship and/or may be analyzed to identify secondary, tertiary, and/or other dependencies and/or relationships. According to some embodiments, the processing at 418 and/or the method 400 may comprise identifying a characteristic of an application/data dependency/relationship, at 420. Various data metrics and/or values descriptive of a particular dependency/relationship may be identified and/or computed, for example, based on the stored/standardized dependency/relationship data. In some embodiments, the characteristic may comprise one or more of: (i) a number of times/instances (e.g., a count) that a particular dependency/relationship occurs, (ii) a number of errors associated with a particular dependency/relationship, and/or (iii) a volume of messages associated with a particular dependency/relationship.

In some embodiments, the method 400 may comprise computing (e.g., by a data processing and/or transformation engine) a score (and/or other metric) for one or more of the dependencies/relationships, at 422. According to some embodiments, different characteristics of a dependency/relationship and/or different values of the characteristics may be utilized to compute a score for the dependency/relationship. As a non-limiting example, the number of instances/occurrences of a dependency/relationship may be utilized to compute a first or confidence level score, the number (or frequency) of errors for the dependency/relationship may be utilized to compute a second or resilience score (e.g., a health metric), and/or the number, volume, and/or type of messages associated with the dependency/relationship may be utilized to compute a third or critical path score. In some embodiments, these and/or other characteristics may be utilized to compute and/or define one or more scores and such scores may be utilized as stand-alone descriptors for a dependency/relationship and/or may be combined, summed, averaged, and/or otherwise mathematically processed to define a single or overall score for any or all dependencies/relationships. In some embodiments, each of a plurality of characteristics of a dependency/relationship may be processed and/or analyzed in turn.

According to some embodiments, the method 400 may comprise determining whether more characteristics should be analyzed and/or processed, at 424. Each characteristic identified for a particular dependency/relationship at 420, for example, may be utilized to compute a score and/or other metric. In some embodiments, only an identifiable subset of characteristics and/or characteristic types may be utilized. In either case, a listing of all characteristics for which scores should be calculated may be consulted to determine whether more score computations are needed, at 424. In the case that it is determined that more score computations are needed (e.g., not all characteristics have been evaluated), the method 400 may continue to and/or loop back to identifying characteristics at 420. In the case that all characteristics have been identified and/or evaluated, the method 400 may comprise and/or continue to determining whether more dependencies/relationships exist, at 426.

In some embodiments, the processing may be conducted and/or repeated for any number of dependencies/relationships. In some embodiments, the processing may be conducted for a subset of dependencies/relationships, e.g., based on user selection and/or input. In either case, the method 400 may determine whether any additional dependencies/relationships remain to be processed at 426. In the case that it is determined that more dependencies/relationships remain to be processed, the method 400 may continue to and/or loop back to processing dependency/relationship data, at 418. In the case that all dependencies/relationships have been processed, the method 400 may comprise and/or continue to outputting (e.g., by the electronic processing device and/or via the user device) a mapping of the dependency/relationship metadata, at 428.

The graphical mapping may comprise, for example, graphical indications of: (i) one or more of the dependencies/relationships, (ii) one or more of the scores, and/or (iii) one or more health metrics. In some embodiments, the graphical mapping may be output via an interface that is generated in accordance with visualization rules, e.g., defined by the user and/or user device. According to some embodiments, the graphical mapping and/or other interface elements descriptive of the dependencies/relationships (and/or subsets or portions thereof) may be selected and/or output based upon the triggering event type, input parameters, and/or content of the harvested dependency/relationship data. The interface may comprise a GUI that is dynamically customized, for example, to output data descriptive of the dependency/relationship data in a manner specific to the dependency/relationship analysis project and/or goal. In the case that the user initiates the harvesting (e.g., at 402) to evaluate the health of a computing ecosystem, for example, the GUI may be customized to output (e.g., at 428) scores, health metrics, and/or system health-related predictions. In some embodiments, depending upon the particular use case, the method 400 may comprise and/or proceed to one or more of "A", "B", and/or "C".

Figure 4B:
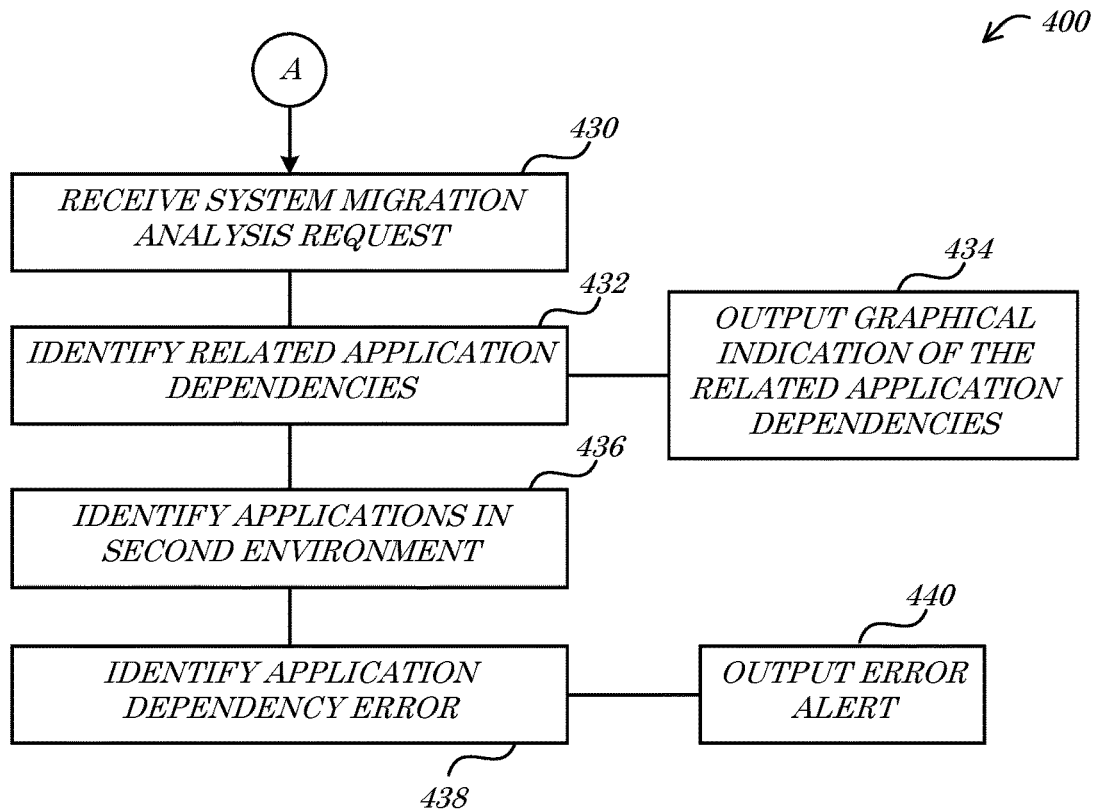
Figure 4B:
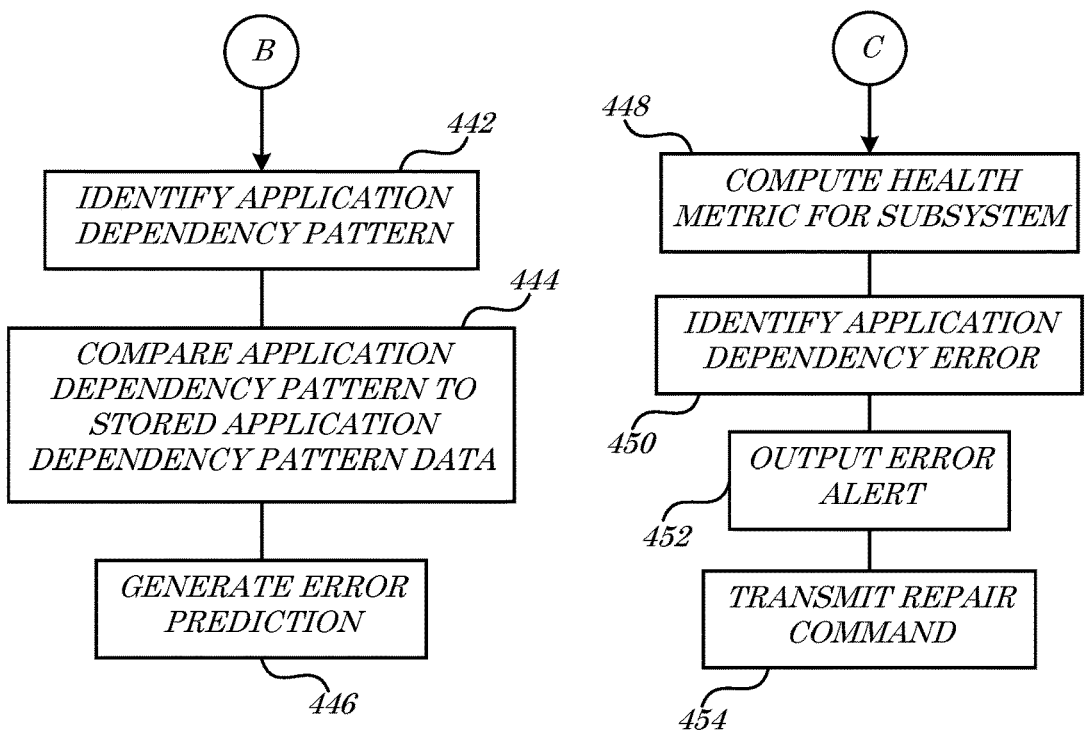
Figure 5A:
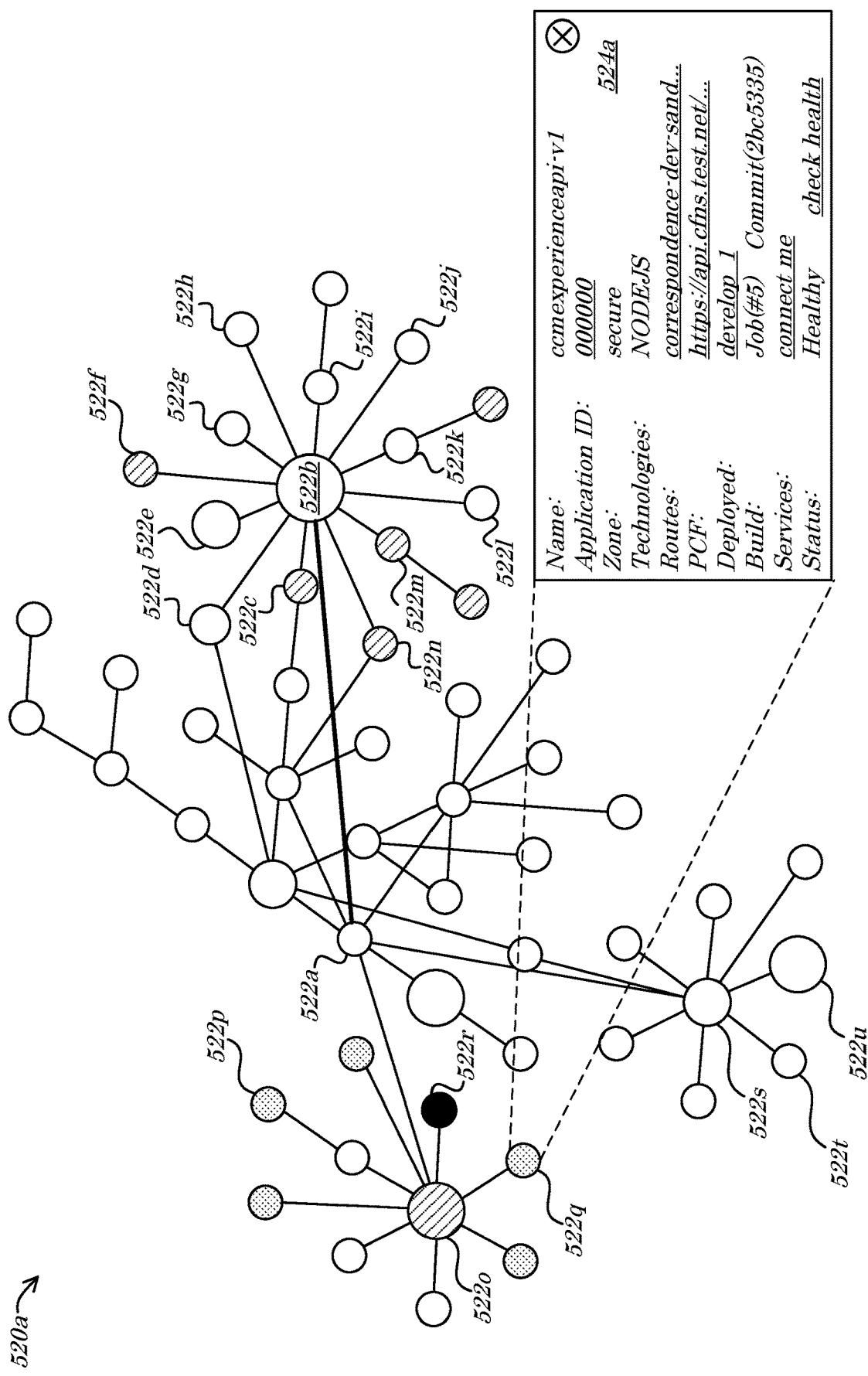
FIG. 5A and FIG. 5B are diagrams of exemplary dependency mapping interfaces according to some embodiments.
Figure 5B:
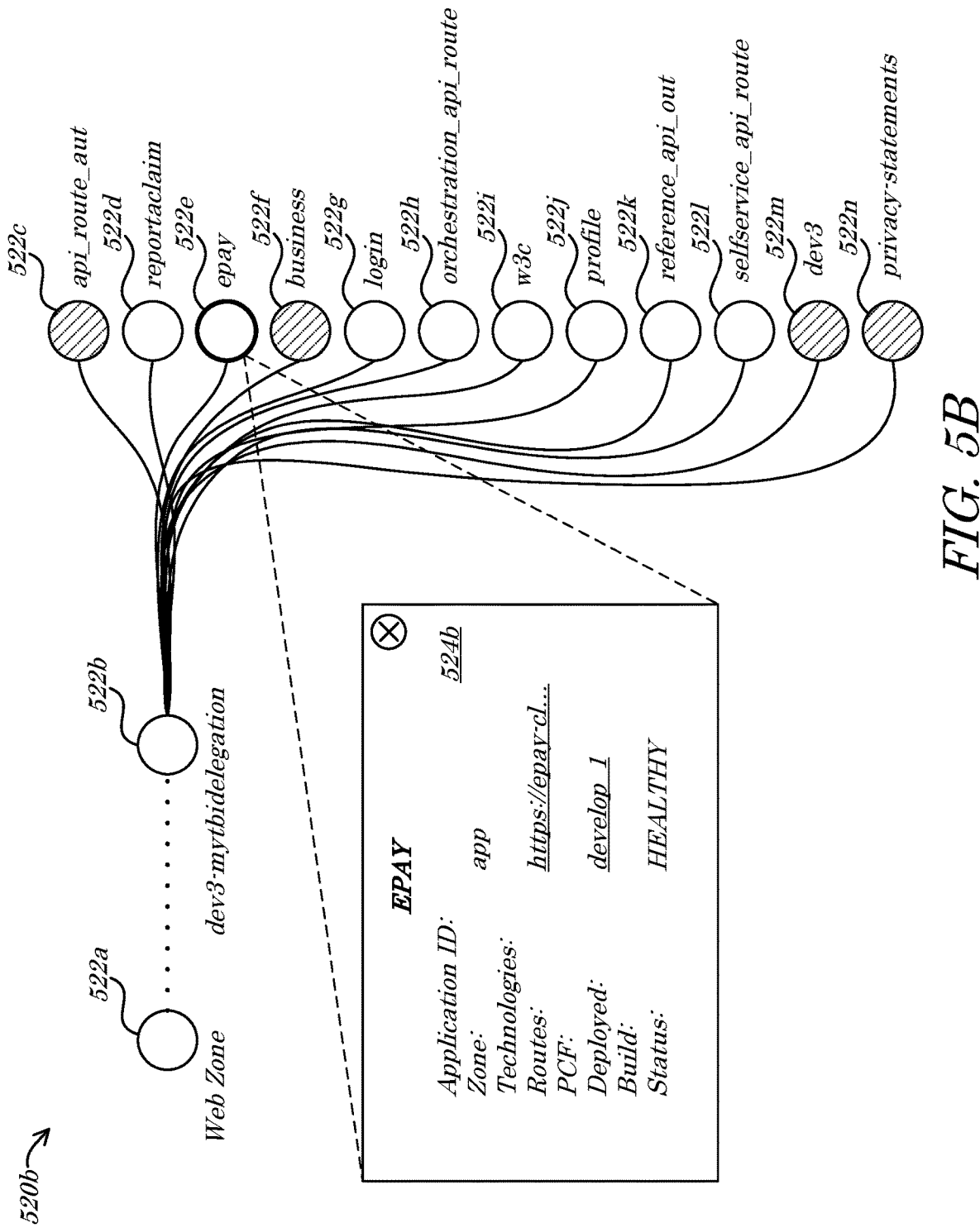

With reference to FIG. 4B, the method 400 (as noted above), may proceed to "A", from which it may further proceed to and/or comprise receiving a system migration analysis request, at 430. According to some embodiments, the request at 430 may comprise the event identified at 402. In some embodiments, the request may identify, for the specific use case of a system migration analysis, two (2) or more computing environments, instances, and/or ecosystems for comparison and/or one or more specific test applications, API objects, data elements, etc. The system migration analysis may request, for example, that the migration of a first API, code, and/or data structure from a first environment (e.g., a testing environment) to a second environment (e.g., a production environment) be evaluated (pre-and/or post-migration). In some embodiments, the method 400 may comprise identifying related application and/or data dependencies, at 432. The system may utilize identifiers for the environments and/or specific API objects and/or data thereof (e.g., the test application/data), for example, to query the standardized and/or processed dependency/relationship data to identify which dependencies/relationships are relevant to the migration. According to some embodiments, the method 400 may comprise outputting a graphical indication of the identified related application/data dependencies/relationships, at 434.

According to some embodiments, the method 400 may comprise identifying applications/data in the second environment, at 436. Based on the identified dependencies/relationships, for example, any applications and/or data elements related to and/or to which the test application/data depends may be identified. In some embodiments, the method 400 may comprise identifying an application/data dependency/relationship error, at 438. In the case that one or more of the identified applications/data in the second environment are missing, inactive, and/or broken, for example, it may be determined that the test application/data and/or the second environment may be likely to fail (e.g., an error or expected error). The dependencies/relationships identified at 432 may comprise dependencies/relationships that have been harvested from current, existing, and/or first subsystems and/or environments, for example, while the error may indicate that one or more of the related and/or associated applications and/or data from these dependencies/relationships are not available to the test application/data in the second environment, e.g., meaning that the test application/data may fail. In some embodiments, the method 400 may output an indication (e.g., an alert) descriptive of the error, at 440. In some embodiments, for example, the specific missing/broken dependencies/relationships may be identified for the user. According to some embodiments, any missing or broken application and/or data dependencies and/or relationships may be represented by differing colors and/or graphics in an output graphical mapping via a GUI. In such a manner, for example, a user may be enabled to quickly visually identify any possible migration errors and/or issues by simply observing red-highlighted or shaded and/or greyed-out dependencies/relationships and/or application and/or data elements depicted via the graphical display.

With reference to FIG. 4B, the method 400 (as noted above), may proceed to "B", from which it may further proceed to identify an application and/or data dependency and/or relationship pattern, at 442. In response to a request for subsystem, API, and/or environment analysis, for example, the system may execute one or more trained AI and/or mathematical models to identify one or more patterns between and/or among various application and/or data dependencies and/or relationships. In some embodiments, the method 400 may comprise comparing the identified pattern(s) to stored application and/or data dependency and/or relationship pattern data, at 444. The AI model may be utilized, for example, to classify and/or categorize the identified pattern with respect to a training data set of previously-identified patterns. According to some embodiments, the method 400 may comprise generating an error prediction, at 446. The AI model may be further utilized, for example, to compute a measure of predicted error or failure for one or more dependencies/relationships and/or for a related AI, application, data element, etc. In the case that one of the dependencies for an analyzed API comprises a data source that is unreliable, for example, an estimated measure of success and/or failure for the API may be computed based on levels of success/failure for other API objects that rely on the same data source. In some embodiments, the predicted and/or estimated error, failure, and/or success metric may comprise a metadata metric that is output to the user (e.g., at 428), e.g., via a graphical and/or graphical mapping interface.

With reference to FIG. 4B, the method 400 (as noted above), may proceed to "C", from which it may further proceed to compute a health metric for a subsystem (and/or API, application, data, etc.), at 448. The health metric may be calculated and/or computed (e.g., by an AI model) based upon at least one of the characteristics and/or scores for one or more dependencies/relationships, for example. In some embodiments, the method 400 may comprise identifying an application and/or data dependency and/or relationship error, at 450. The error may comprise, for example, a value of the health metric being below a predetermined threshold. As a non-limiting example, a health metric that is based on a volume of messages associated with an API dependency may be zero (0), indicating that no messages have been exchanged with respect to the API dependency, which may indicate (and/or define) the error. In some embodiments, the method 400 may comprise outputting an error alert, at 452. The alert may be output via the GUI, for example, to highlight a broken communication link, API call, network address and/or identifier, database field reference, etc.

In some embodiments, the method 400 may comprise transmitting a repair command, at 454. According to some embodiments, the repair command (and/or the transmitting thereof) may be based on and/or in response to the identifying of the error at 450 and/or the generation of the error prediction at 446. The repair command may comprise, for example, a prompt for the user to address a broken and/or problematic relationship and/or dependency (and/or missing API, application, data element, etc.). According to some embodiments, the repair command may be sourced from a repository of available and/or applicable repair commands. Based on a type of the error (and/or predicted error), for example, one repair command from a plurality of available repair commands may be selected for transmission. In some embodiments, the repair command may comprise a command that identifies correct address and/or communications data that is selected to replace bad (e.g., outdated) data that has led to a communication error. According to some embodiments, the command may be issued to a system component, such as a scripting engine and/or code repair, deployment, maintenance, and/or editing platform and/or API. In some embodiments, the command may be received by a system component and may cause the component to undertake an action to execute a repair (e.g., of the identified error), In the case that the error is identified and/or predicted automatically, such as by the AI model(s), the system may operate as a self-healing system that both identifies errors (and/or potential errors) with application and/or data dependencies and/or relationships and also automatically conducts self-healing actions to repair and/or replace error-related dependencies and/or relationships.

IV. Application/Data Dependency Identification, Visualization, And/Or Management Interfaces Turning now to FIG. 5A and FIG. 5B, diagrams of exemplary dependency mapping interfaces 520a-b according to some embodiments are shown. The interfaces 520a-b may comprise instances of example graphical mappings of application/data dependencies/relationships, e.g., output to provide visualization of automatically harvested and processed dependency and/or relationship data for one or more computing and/or electronic subsystems, ecosystems, and/or environments. In some embodiments, a first example interface 520a may comprise a hub-and-spoke or "star" mapping that comprises graphical representations (e.g., circles) for each of a plurality of nodes 522a-u. The nodes 522a-u may represent, for example, individual applications, API objects, data elements, and/or other computing environment elements, with the lines connecting the nodes 522a-u representing dependencies and/or relationships between and/or among the nodes 522a-u. According to some embodiments, the graphical representations of the nodes 522a-u and/or the relationships/dependencies may be sized, color-coded, and/or otherwise graphically distinguished to convey information descriptive of the respective nodes 522a-u and/or relationships/dependencies. As depicted in the first example interface 520a in FIG. 5A, for example, each of a first node 522a and a second node 522b may be represented in a first color/pattern to indicate, for example, a status. In some embodiments, the second node 522b may be represented with a larger circle than the first node 522a to indicate various data, such as a number of dependencies, a frequency of use, a number of messages handled, a number of errors, etc. The second node 522b may be represented with the larger circle, for example, to indicate that the second node 522b has more dependencies than the first node 522a and/or that the second node 522b is more often utilized (e.g., called, executed, queried). In some embodiments, the relationship between the first and second nodes 522a-b may be represented as a thicker (and/or different style and/or color) line than other relationships to indicate, for example, a higher number of messages associated with the relationship/dependency, a current status/healthiness of the relationship/dependency, a computed score for the relationship/dependency, etc. In some embodiments, the relationship between the first and second nodes 522a-b (e.g., "A: B") may be presented in a manner (e.g., line thickness, style, color, etc.) to indicate that the relationship has been determined to have a confidence level score above a predefined confidence level threshold.

According to some embodiments, an indication of a score and/or health metric for a node 522a-u may be represented by a color and/or fill pattern of the representative circles in the first example interface 520a. A first subset of nodes comprising sixteenth and seventeenth nodes 522p-q may be presented in a first color and/or pattern to indicate a first status (e.g., "healthy"), for example, a second subset of nodes comprising third, sixth, thirteenth, and fourteenth nodes 522c, 522f, 522m-n may be presented in a second color and/or pattern to indicate a second status (e.g., "warning"), and/or a third subset of nodes comprising an eighteenth node 522r may be presented in a third color and/or pattern to indicate a third status (e.g., "broken"/error). According to some embodiments, the status may be indicative of a score and/or health metric value for a particular node 522a-u falling within a certain predefined range and/or meeting a predefined criterion with respect to a threshold, rules, etc. The sixteenth and seventeenth nodes 522p-q may be output with the indication of the first status, for example, due to each of the sixteenth and seventeenth nodes 522p-q being determined to have a resiliency score above a predefined resiliency threshold. According to some embodiments, and as depicted in the second example interface 520b in FIG. 5B, the second example interface 520b may comprise a "tree" mapping that comprises graphical representations (e.g., circles) for each of a subset (522a-n) of the plurality of nodes 522a-u. As depicted with respect to the first relationship between the first and second nodes 522a-b in FIG. 5B, different graphical elements and/or representations may be utilized to provide visualization of the underlying relationship/dependency metadata for the subsystem being viewed/analyzed.

In some embodiments, the example interfaces 520a-b may be interactive by, e.g., comprising graphical input elements via which input from a user may be received. As depicted, for example, in the case that a user selects (e.g., clicks on, switches focus to, mouses over) the representation of the seventeenth node 522q in the first example interface 520a, a first information screen and/or pop-up 524a may be presented (e.g., generated and/or output). In the second example interface 520b, in the case that the user selects the representation of the fifth node 522e (e.g., "epay"), a second information screen and/or pop-up 524b may be presented (e.g., generated and/or output). The pop-ups 524a-b may comprise, for example, metadata details descriptive of the selected nodes 522e, 522q. In some embodiments, the metadata (or portions thereof) may provide and/or comprise links (e.g., represented by underlined data) via which the user may provide further selection to navigate to additional details, metadata, and/or analysis of application, API, data element, and/or relationship/dependency characteristics, attributes, scores, and/or metrics.

Fewer or more components 522a-u, 524a-b and/or various configurations of the depicted components 522a-u, 524a-b may be included in the interfaces 520a-b without deviating from the scope of embodiments described herein. In some embodiments, the components 522a-u, 524a-b may be similar in configuration and/or functionality to similarly named and/or numbered components as described herein. In some embodiments, the interfaces 520a-b (and/or portions thereof) may comprise and/or be generated and/or output by an application/data dependency and/or relationship identification, visualization, and/or management system and/or a platform programmed and/or otherwise configured to execute, conduct, and/or facilitate the method 400 of FIG. 4A and/or FIG. 4B herein, and/or portions thereof.

Figure 6A:
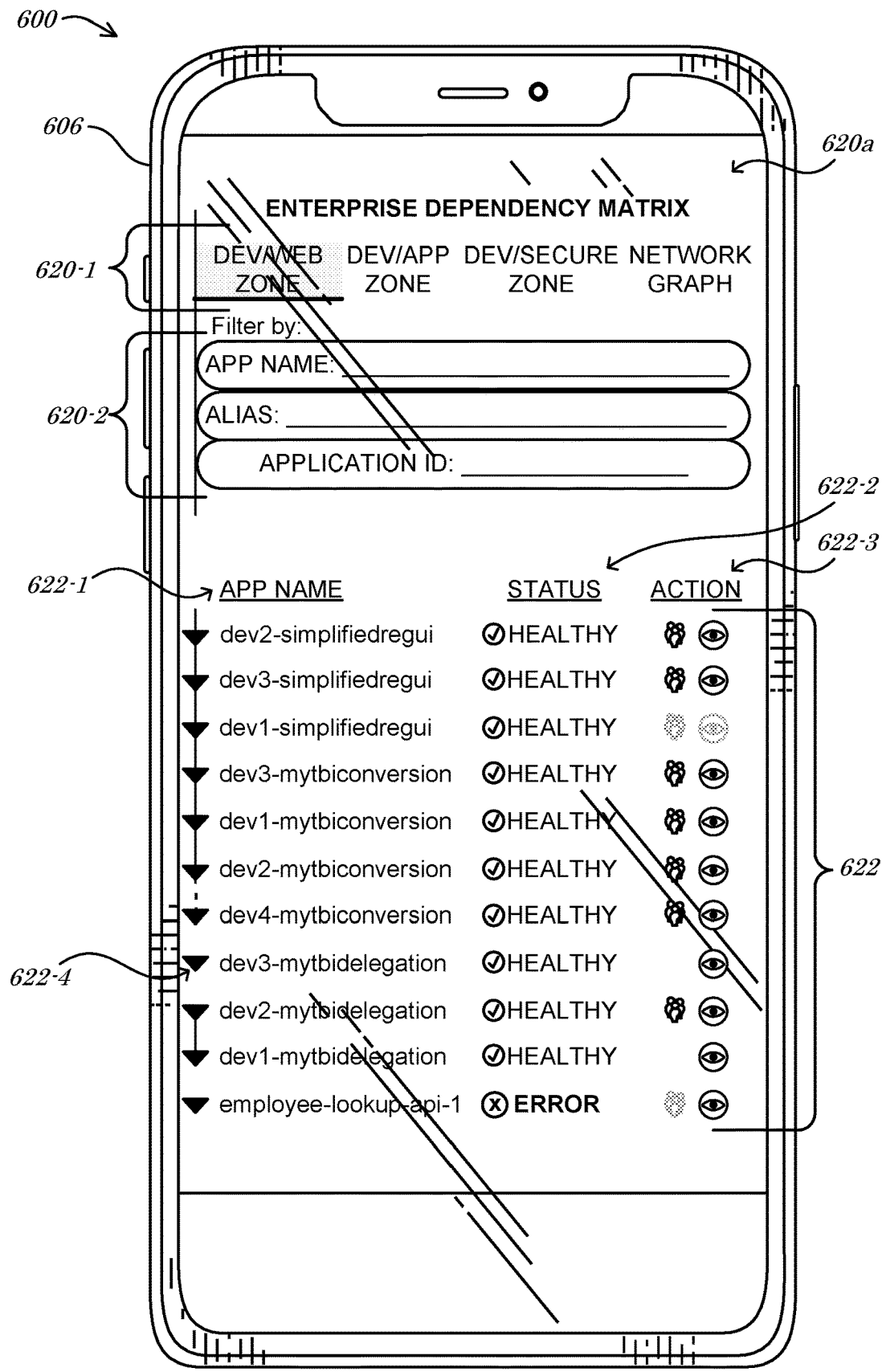
FIG. 6A and FIG. 6B are diagrams of example application interfaces according to some embodiments.
Figure 6B:
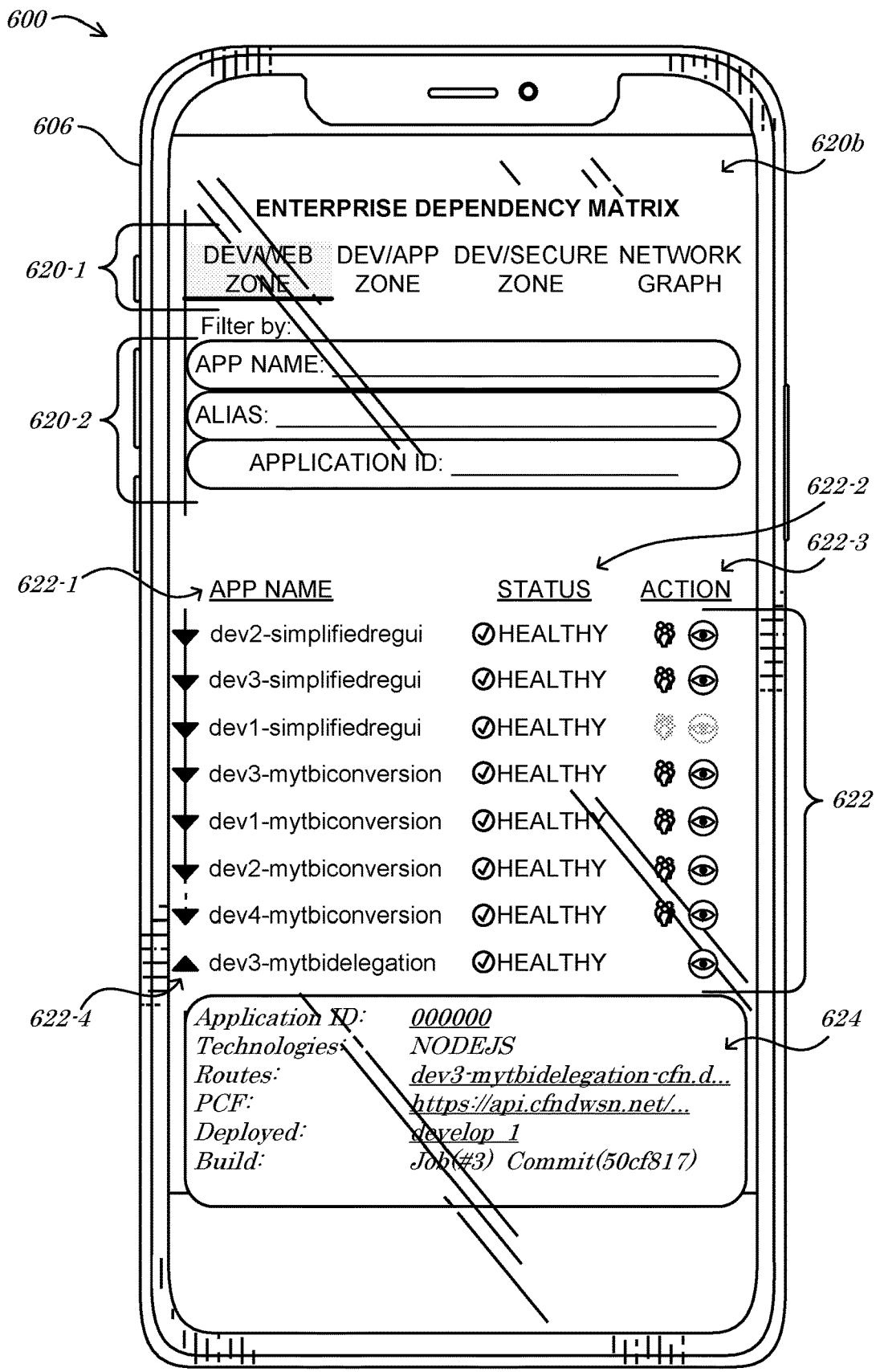

Referring now to FIG. 6A and FIG. 6B, diagrams of a system 600 depicting a user device 606 providing instances of an example interface 620*a-b* according to some embodiments are shown. In some embodiments, the interfaces 620*a-b* may comprise application/API interface screens, web pages, web forms, database entry forms, API instances, spreadsheets, tables, and/or applications or other GUI instances via which a user may utilize application/data dependency and/or relationship data, as described herein. The interfaces 620*a-b* may, for example, comprise a front-end of an application/data dependency and/or relationship identification, visualization, and/or management program and/or platform programmed and/or otherwise configured to execute, conduct, and/or facilitate the method 400 of FIG. 4A and/or FIG. 4B herein, and/or portions thereof. In some embodiments, interfaces 620*a-b* may be output via a computerized device, such as the user device 606, which may, for example, be in communication with one or more of the controller devices 110, 210*a-c*, 310*a-c* of FIG. 1, FIG. 2, and/or FIG. 3 herein. The interfaces 620*a-b* may, as depicted for example, comprise application/data dependency and/or relationship data representations output via the user device 606, which may comprise various graphical representations, mappings, and/or interface/input elements.

According to some embodiments, the interfaces 620*a-b* may comprise one or more tabs and/or other segmented and/or logically-presented data forms and/or fields. In some embodiments, the interfaces 620*a-b* may be configured and/or organized to allow and/or facilitate visualization and/or interaction with automatically harvested application and/or data dependency/relationship metadata. In some embodiments, a first version (or page, instance, orientation, view, and/or aspect) of the interface 620*a* as depicted in FIG. 6A may comprise a first visualization that comprises a menu 620-1, a search input area 620-2, and/or a dependency metadata listing 622.

In some embodiments, the menu 620-1 may be utilized to select a particular subsystem and/or environment for analysis, e.g., the "DEV/WEB ZONE" depicted as having been selected in FIG. 6A and FIG. 6B. According to some embodiments, within any particular subsystem/environment, the user may search to identify any applications, API objects, data elements, and/or dependencies and/or relationships utilizing the search input area 620-2. In some embodiments, the dependency metadata listing 622 may provide identifying details representing any searched and/or otherwise presented applications, API objects, data elements, and/or dependencies and/or relationships. As depicted in FIG. 6A, for example, the first version of the interface 620*a* and/or the dependency metadata listing 622 may comprise a first or "App Name" column 622-1, a second or "Status" column 622-2, and/or a third or "Action" column 622-3. The first column 622-1 may provide a listing of names identifying each of the listed applications, API objects, data elements, and/or dependencies and/or relationships (e.g., matching and/or satisfying any search terms entered into the search input area 620-2), for example, and/or the second column 622-2 may comprise one or more status indicators such as "Healthy" or "Error" and/or corresponding graphical indications such as the checkmarks and/or "x"-s shown. In some embodiments, the third column 622-3 may comprise indicators and/or input elements that offer various functionality, such as refreshing status information, sharing the listed information, and/or retrieving certain data descriptive of listed items. In some embodiments, the dependency metadata listing 622 may also or alternatively comprise a toggle button 622-4, e.g., for each listed item, that may be utilized to access (and/or "toggle" access and/or outputting of) additional details regarding a listed item, such as dependency metadata, scores, health metrics, characteristics, etc.

According to some embodiments, a second version (or page, instance, orientation, view, and/or aspect) of the interface 620*b* as depicted in FIG. 6B may comprise a second visualization that comprises a dependency metadata window 624. The dependency metadata window 624 (and/or the second version of the interface 620*b*) may be generated and/or output, for example, in response to receiving user input via the toggle button 622-4 for a particular listed item (e.g., "dev3-mytbidelegation"). In some embodiments, the dependency metadata window 624 may provide a visualization of one or more characteristics, parameters, metrics, scores, values, network locations, etc., descriptive of the selected item. In such a manner, for example, the user may be presented with the first visualization (via the first version of the interface 620*a*) and interact with (e.g., provide input via) the first version of the interface 620*a* to drill-down and retrieve additional details descriptive of one or more items of interest from the dependency metadata listing 622.

Fewer or more components 606, 602*a-b*, 620-1, 620-2, 622, 622-1, 622-2, 622-3, 622-4, 624 and/or various configurations of the depicted components 606, 602*a-b*, 620-1, 620-2, 622, 622-1, 622-2, 622-3, 622-4, 624 may be included in the system 600 without deviating from the scope of embodiments described herein. In some embodiments, the components 606, 602*a-b*, 620-1, 620-2, 622, 622-1, 622-2, 622-3, 622-4, 624 may be similar in configuration and/or functionality to similarly named and/or numbered components as described herein. In some embodiments, the system 600 (and/or portions thereof) may comprise an application/data dependency and/or relationship identification, visualization, and/or management system and/or a platform programmed and/or otherwise configured to execute, conduct, and/or facilitate the method 400 of FIG. 4A and/or FIG. 4B herein, and/or portions thereof.

While various components of the interfaces 520*a-b*, 620*a-b* have been depicted with respect to certain graphical objects, labels, layouts, headings, titles, and/or configurations, these features have been presented for reference and example only. Other graphical objects, labels, layouts, headings, titles, and/or configurations may be implemented without deviating from the scope of embodiments herein. Similarly, while a certain number of tabs, information screens, form fields, and/or data entry options may be presented and/or inferred, variations thereof may be practiced in accordance with some embodiments.

V. Application Dependency Identification, Visualization, And/Or Management Apparatus & Articles of Manufacture Turning to FIG. 7, a block diagram of an apparatus 710 according to some embodiments is shown. In some embodiments, the apparatus 710 may be similar in configuration and/or functionality to one or more of the third-party device 106 and/or the controller devices 110, 210*a-c*, 310*a-c* of FIG. 1, FIG. 2, and/or FIG. 3 herein. The apparatus 710 may, for example, execute, process, facilitate, and/or otherwise be associated with the method 400 of FIG. 4A and/or FIG. 4B herein, and/or portions thereof. In some embodiments, the apparatus 710 may comprise a processing device 712, a communication device 714, an input device 716, an output device 718, an interface 720, a memory device 740 (storing various programs and/or instructions 742 and data 744), and/or a cooling device 750. According to some embodiments, any or all of the components 712, 714, 716, 718, 720, 740, 742, 744, 750 of the apparatus 710 may be similar in configuration and/or functionality to any similarly named and/or numbered components described herein. Fewer or more components 712, 714, 716, 718, 720, 740, 742, 744, 750 and/or various configurations of the components 712, 714, 716, 718, 720, 740, 742, 744, 750 may be included in the apparatus 710 without deviating from the scope of embodiments described herein.

According to some embodiments, the processor 712 may be or include any type, quantity, and/or configuration of processor that is or becomes known. The processor 712 may comprise, for example, an Intel® IXP 2800 network processor or an Intel® XEON™ Processor coupled with an Intel® E7501 chipset. In some embodiments, the processor 712 may comprise multiple interconnected processors, microprocessors, and/or micro-engines. According to some embodiments, the processor 712 (and/or the apparatus 710 and/or other components thereof) may be supplied power via a power supply (not shown), such as a battery, an Alternating Current (AC) source, a Direct Current (DC) source, an AC/DC adapter, solar cells, and/or generator. In the case that the apparatus 710 comprises a server, such as a blade server, necessary power may be supplied via a standard AC outlet, power strip, surge protector, and/or Uninterruptible Power Supply (UPS) device.

In some embodiments, the communication device 714 may comprise any type or configuration of communication device that is or becomes known or practicable. The communication device 714 may, for example, comprise a Network Interface Card (NIC), a telephonic device, a cellular network device, a router, a hub, a modem, and/or a communications port or cable. In some embodiments, the communication device 714 may be coupled to receive user input data, e.g., from a user device (not shown in FIG. 7). The communication device 714 may, for example, comprise a Bluetooth® Low Energy (BLE) and/or RF receiver device that acquires data from a user (not separately depicted in FIG. 7) and/or a transmitter device that provides the data to a remote server and/or server or communications layer (also not separately shown in FIG. 7). According to some embodiments, the communication device 714 may also or alternatively be coupled to the processor 712. In some embodiments, the communication device 714 may comprise an infrared (IR), RF, Bluetooth™, Near-Field Communication (NFC), and/or Wi-Fi® network device coupled to facilitate communications between the processor 712 and another device (such as a remote user device, not separately shown in FIG. 7).

In some embodiments, the input device 716 and/or the output device 718 are communicatively coupled to the processor 712 (e.g., via wired and/or wireless connections and/or pathways) and they may generally comprise any types or configurations of input and output components and/or devices that are or become known, respectively. The input device 716 may comprise, for example, a keyboard that allows an operator of the apparatus 710 to interface with the apparatus 710 (e.g., by an application/data dependency and/or relationship identification, visualization, and/or management system administrator). The output device 718 may, according to some embodiments, comprise a display screen and/or other practicable output component and/or device. The output device 718 may, for example, provide an interface (such as the interface 720 and/or the interfaces 520*a*-*b*, 620*a*-*b* of FIG. 5A, FIG. 5B, FIG. 6A, and/or FIG. 6B) via which functionality for application/data dependency and/or relationship identification, visualization, and/or management is provided to a user (e.g., via a website and/or mobile device application). According to some embodiments, the input device 716 and/or the output device 718 may comprise and/or be embodied in a single device, such as a touchscreen monitor.

The memory device 740 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 740 may, according to some embodiments, store one or more of harvesting instructions 742-1, standardization instructions 742-2, transformation instructions 742-3, scoring instructions 742-4, interface instructions 742-5, input data 744-1, dependency data 744-2, and/or interface element data 744-3. In some embodiments, the harvesting instructions 742-1, standardization instructions 742-2, transformation instructions 742-3, scoring instructions 742-4, interface instructions 742-5, input data 744-1, dependency data 744-2, and/or interface element data 744-3 may be utilized by the processor 712 to provide output information via the output device 718 and/or the communication device 714.

According to some embodiments, the harvesting instructions 742-1 may be operable to cause the processor 712 to process the input data 744-1, dependency data 744-2, and/or interface element data 744-3 in accordance with embodiments as described herein. Input data 744-1, dependency data 744-2, and/or interface element data 744-3 received via the input device 716 and/or the communication device 714 may, for example, be analyzed, sorted, filtered, decoded, decompressed, ranked, scored, plotted, and/or otherwise processed by the processor 712 in accordance with the harvesting instructions 742-1. In some embodiments, input data 744-1, dependency data 744-2, and/or interface element data 744-3 may be fed by the processor 712 through one or more mathematical and/or statistical formulas and/or models in accordance with the harvesting instructions 742-1 to cause and automatic and/or selective harvesting (e.g., identification of) and/or processing of application/data dependency and/or relationship information, as described herein.

In some embodiments, the standardization instructions 742-2 may be operable to cause the processor 712 to process the input data 744-1, dependency data 744-2, and/or interface element data 744-3 in accordance with embodiments as described herein. Input data 744-1, dependency data 744-2, and/or interface element data 744-3 received via the input device 716 and/or the communication device 714 may, for example, be analyzed, sorted, filtered, decoded, decompressed, ranked, scored, plotted, and/or otherwise processed by the processor 712 in accordance with the standardization instructions 742-2. In some embodiments, input data 744-1, dependency data 744-2, and/or interface element data 744-3 may be fed by the processor 712 through one or more mathematical and/or statistical formulas and/or models in accordance with the standardization instructions 742-2 to categorize, analyze, standardize, and/or normalize application/data dependency and/or relationship information, as described herein.

According to some embodiments, the transformation instructions 742-3 may be operable to cause the processor 712 to process the input data 744-1, dependency data 744-2, and/or interface element data 744-3 in accordance with embodiments as described herein. Input data 744-1, dependency data 744-2, and/or interface element data 744-3 received via the input device 716 and/or the communication device 714 may, for example, be analyzed, sorted, filtered, decoded, decompressed, ranked, scored, plotted, and/or otherwise processed by the processor 712 in accordance with the transformation instructions 742-3. In some embodiments, input data 744-1, dependency data 744-2, and/or interface element data 744-3 may be fed by the processor 712 through one or more mathematical and/or statistical formulas and/or models in accordance with the transformation instructions 742-3 to identify, classify, and/or otherwise compute one or more metrics and/or metadata for application/data dependency and/or relationship information, as described herein.

In some embodiments, the scoring instructions 742-4 may be operable to cause the processor 712 to process the input data 744-1, dependency data 744-2, and/or interface element data 744-3 in accordance with embodiments as described herein. Input data 744-1, dependency data 744-2, and/or interface element data 744-3 received via the input device 716 and/or the communication device 714 may, for example, be analyzed, sorted, filtered, decoded, decompressed, ranked, scored, plotted, and/or otherwise processed by the processor 712 in accordance with the scoring instructions 742-4. In some embodiments, input data 744-1, dependency data 744-2, and/or interface element data 744-3 may be fed by the processor 712 through one or more mathematical and/or statistical formulas and/or models in accordance with the scoring instructions 742-4 to score and/or rank one or more applications, API objects, data elements, and/or dependencies and/or relationships, as described herein.

According to some embodiments, the interface instructions 742-5 may be operable to cause the processor 712 to process the input data 744-1, dependency data 744-2, and/or interface element data 744-3 in accordance with embodiments as described herein. Input data 744-1, dependency data 744-2, and/or interface element data 744-3 received via the input device 716 and/or the communication device 714 may, for example, be analyzed, sorted, filtered, decoded, decompressed, ranked, scored, plotted, and/or otherwise processed by the processor 712 in accordance with the interface instructions 742-5. In some embodiments, input data 744-1, dependency data 744-2, and/or interface element data 744-3 may be fed by the processor 712 through one or more mathematical and/or statistical formulas and/or models in accordance with the interface instructions 742-5 to generate and/or output various interface instances, environments, visualizations, and/or other interface and/or input elements, as described herein.

According to some embodiments, the apparatus 710 may comprise the cooling device 750. According to some embodiments, the cooling device 750 may be coupled (physically, thermally, and/or electrically) to the processor 712 and/or to the memory device 740. The cooling device 750 may, for example, comprise a fan, heat sink, heat pipe, radiator, cold plate, and/or other cooling component or device or combinations thereof, configured to remove heat from portions or components of the apparatus 710.

Any or all of the exemplary instructions and data types described herein and other practicable types of data may be stored in any number, type, and/or configuration of memory devices that is or becomes known. The memory device 740 may, for example, comprise one or more data tables or files, databases, table spaces, registers, and/or other storage structures. In some embodiments, multiple databases and/or storage structures (and/or multiple memory devices 740) may be utilized to store information associated with the apparatus 710. According to some embodiments, the memory device 740 may be incorporated into and/or otherwise coupled to the apparatus 710 (e.g., as shown) or may simply be accessible to the apparatus 710 (e.g., externally located and/or situated).

Referring to FIG. 8A, FIG. 8B, FIG. 8C, FIG. 8D, and FIG. 8E, perspective diagrams of exemplary data storage devices 840*a-e* according to some embodiments are shown. The data storage devices 840*a-e* may, for example, be utilized to store instructions and/or data, such as the harvesting instructions 742-1, standardization instructions 742-2, transformation instructions 742-3, scoring instructions 742-4, interface instructions 742-5, input data 744-1, dependency data 744-2, and/or interface element data 744-3, each of which is presented in reference to FIG. 7 herein. In some embodiments, instructions stored on the data storage devices 840*a-e* may, when executed by a processor, cause the implementation of and/or facilitate the method 400 of FIG. 4A and/or FIG. 4B herein, and/or portions thereof.

According to some embodiments, the first data storage device 840*a* may comprise one or more various types of internal and/or external hard drives. The first data storage device 840*a* may, for example, comprise a data storage medium 846 that is read, interrogated, and/or otherwise communicatively coupled to and/or via a disk reading device 848. In some embodiments, the first data storage device 840*a* and/or the data storage medium 846 may be configured to store information utilizing one or more magnetic, inductive, and/or optical means (e.g., magnetic, inductive, and/or optical-encoding). The data storage medium 846, depicted as a first data storage medium 846*a* for example (e.g., breakout cross-section "A"), may comprise one or more of a polymer layer 846*a*-1, a magnetic data storage layer 846*a*-2, a non-magnetic layer 846*a*-3, a magnetic base layer 846*a*-4, a contact layer 846*a*-5, and/or a substrate layer 846*a*-6. According to some embodiments, a magnetic read head 848*a* may be coupled and/or disposed to read data from the magnetic data storage layer 846*a*-2.

In some embodiments, the data storage medium 846, depicted as a second data storage medium 846*b* for example (e.g., breakout cross-section "B"), may comprise a plurality of data points 846*b*-2 disposed with the second data storage medium 846*b*. The data points 846*b*-2 may, in some embodiments, be read and/or otherwise interfaced with via a laser-enabled read head 848*b* disposed and/or coupled to direct a laser beam through the second data storage medium 846*b*.

In some embodiments, the second data storage device 840*b* may comprise a CD, CD-ROM, DVD, Blu-Ray™ Disc, and/or other type of optically-encoded disk and/or other storage medium that is or becomes know or practicable. In some embodiments, the third data storage device 840*c* may comprise a USB keyfob, dongle, and/or other type of flash memory data storage device that is or becomes know or practicable. In some embodiments, the fourth data storage device 840*d* may comprise RAM of any type, quantity, and/or configuration that is or becomes practicable and/or desirable. In some embodiments, the fourth data storage device 840*d* may comprise an off-chip cache, such as a Level 2 (L2) cache memory device. According to some embodiments, the fifth data storage device 840*e* may comprise an on-chip memory device, such as a Level 1 (L1) cache memory device.

The data storage devices 840*a-e* depicted in FIG. 8A, FIG. 8B, FIG. 8C, FIG. 8D, and FIG. 8E are representative of a class and/or subset of computer-readable media that are defined herein as "computer-readable memory" (e.g., non-transitory memory devices as opposed to transmission devices or media). The data storage devices 840*a-e* may generally store program instructions, algorithms, software engines, code, and/or modules that, when executed by a processing device cause a particular machine to function in accordance with one or more embodiments described herein.

VI. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Neither the Title (set forth at the beginning of the first page of this patent application) nor the Abstract (set forth at the end of this patent application) is to be taken as limiting in any way as the scope of the disclosed invention(s). Headings of sections provided in this patent application are for convenience only, and are not to be taken as limiting the disclosure in any way.

All definitions, as defined and used herein, should be understood to control over dictionary definitions, definitions in documents incorporated by reference, and/or ordinary meanings of the defined terms. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The indefinite articles "a" and "an," as used herein in the specification and in the claims, unless clearly indicated to the contrary, should be understood to mean "at least one" or "one or more".

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

As utilized herein, the terms "program" or "computer program" may refer to one or more algorithms formatted for execution by a computer. The term "module" or "software module" refers to any number of algorithms and/or programs that are written to achieve a particular output and/or output goal—e.g., a 'login credentialing' module (or program) may provide functionality for permitting a user to login to a computer software and/or hardware resource and/or a 'shipping' module (or program) may be programmed to electronically initiate a shipment of an object via a known and/or available shipping company and/or service (e.g., FedEX®). The terms "engine" or "software engine" refer to any combination of software modules and/or algorithms that operate upon one or more inputs to define one or more outputs in an ongoing, cyclical, repetitive, and/or loop fashion. Data transformation scripts and/or algorithms that query data from a data source, transform the data, and load the transformed data into a target data repository may be termed 'data transformation engines', for example, as they repetitively operate in an iterative manner upon each row of data to produce the desired results.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A system for automatic application dependency mapping, comprising:
at least one electronic processing device; and
at least one non-transitory memory device in communication with the at least one electronic processing device, the at least one non-transitory memory device storing (i) a plurality of extensible dependency harvester plugin modules, (ii) rules defining a dependency harvester engine, (iii) rules defining a dependency data transformation engine, (iv) dependency visualization interface rules, and (v) operating instructions, that when executed by the at least one electronic processing device, result in:
executing a first calling, by an execution by the at least one electronic processing device of the rules defining the dependency harvester engine, of each extensible dependency harvester plugin module of the plurality of extensible dependency harvester plugin modules;
identifying, by each extensible dependency harvester plugin module of the plurality of extensible dependency harvester plugin modules and in response to the first calling, and by activating a first subsystem in communication with the respective extensible dependency harvester plugin module of the plurality of extensible dependency harvester plugin modules, a first application dependency, wherein the first subsystem resides in a first environment;
generating, by each extensible dependency harvester plugin module of the plurality of extensible dependency harvester plugin modules, data descriptive of the identified first application dependency;
translating, by the execution by the at least one electronic processing device of the rules defining the dependency harvester engine, the data descriptive of the identified first application dependencies into a standardized format that represents the identified first application dependencies;
storing, by the execution by the at least one electronic processing device of the rules defining the dependency harvester engine and in a database, the data descriptive of the identified first application dependencies in the standardized format that represents the identified first application dependencies;
processing, by an execution by the at least one electronic processing device of the rules defining the dependency data transformation engine, the stored data descriptive of the identified first application dependencies in the standardized format that represents the identified first application dependencies, wherein the processing comprises generating processed first application dependency data by executing at least one functionality of (i) aggregating portions of the stored data that are descriptive of an identical dependency and (ii) creating a relationship between two or more portions of the stored data that share a common dependency; and outputting, via a graphical user interface (GUI) and by an execution by the at least one electronic processing device of the dependency visualization interface rules, a graphical mapping of a set of the processed first application dependency data.

2. The system for automatic application dependency mapping of claim 1, wherein the processing of the stored data descriptive of the identified first application dependencies in the standardized format that represents the identified first application dependencies, further comprises:

identifying, for each identified first application dependency, a characteristic of the identified first application dependency; and computing, based on the identified characteristic of the identified first application dependency and for each identified first application dependency, a score.

3. The system for automatic application dependency mapping of claim 2, wherein the graphical mapping of the set of the processed first application dependency data comprises a graphical indication of the scores for the identified first application dependencies of the set of the processed first application dependency data.

4. The system for automatic application dependency mapping of claim 2, wherein the identified characteristic of the identified first application dependency comprises a number of times that the identified first application dependency is found within the stored data descriptive of the identified first application dependency in the standardized format that represents the identified first application dependencies, and wherein the score comprises a confidence level score.

5. The system for automatic application dependency mapping of claim 2, wherein the identified characteristic of the identified first application dependency comprises a measure of an amount of errors identified for communications pursuant to the identified first application dependency, and wherein the score comprises a resiliency score.

6. The system for automatic application dependency mapping of claim 2, wherein the identified characteristic of the identified first application dependency comprises a measure of a volume of messages identified for communications pursuant to the identified first application dependency, and wherein the score comprises a critical path score.

7. The system for automatic application dependency mapping of claim 2, wherein the execution of at least one of (i) the plurality of extensible dependency harvester plugin modules, (ii) the rules defining the dependency harvester engine, (iii) the rules defining the dependency data transformation engine, (iv) the dependency visualization interface rules, and (v) the operating instructions, by the at least one electronic processing device, further results in:

computing, by the at least one electronic processing device and based on a plurality of scores for the identified first application dependencies, a health metric for the at least one of the first subsystems.

8. The system for automatic application dependency mapping of claim 7, wherein the graphical mapping of the set of the processed first application dependency data comprises a graphical indication of the health metric for the at least one of the first subsystems.

9. The system for automatic application dependency mapping of claim 7, wherein the at least one non-transitory memory device further stores (vi) artificial intelligence (AI) application dependency architecture analysis rules, and wherein the generating of the processed first application dependency data further comprises:

identifying, by an execution by the at least one electronic processing device of the AI application dependency architecture analysis rules, a pattern among the identified first application dependencies;

comparing, by the execution by the at least one electronic processing device of the AI application dependency architecture analysis rules, the identified pattern to stored data descriptive of historic application dependency patterns; and generating, by the execution by the at least one electronic processing device of the AI application dependency architecture analysis rules and based on the comparing, an error prediction for at least one of (a) the first subsystems and (b) at least one of the identified first application dependencies.

10. The system for automatic application dependency mapping of claim 7, wherein the generating of the processed first application dependency data further comprises:

identifying, by the at least one electronic processing device and based on the health metric for the at least one of the first subsystems, at least one application dependency error.

11. The system for automatic application dependency mapping of claim 10, wherein the execution of at least one of (i) the plurality of extensible dependency harvester plugin modules, (ii) the rules defining the dependency harvester engine, (iii) the rules defining the dependency data transformation engine, (iv) the dependency visualization interface rules, and (v) the operating instructions, by the at least one electronic processing device, further results in:

outputting, via the GUI and by the execution by the at least one electronic processing device of the dependency visualization interface rules, a graphical indication of the at least one application dependency error.

12. The system for automatic application dependency mapping of claim 10, wherein the execution of at least one of (i) the plurality of extensible dependency harvester plugin modules, (ii) the rules defining the dependency harvester engine, (iii) the rules defining the dependency data transformation engine, (iv) the dependency visualization interface rules, and (v) the operating instructions, by the at least one electronic processing device, further results in:

transmitting, by the at least one electronic processing device, at least one command comprising instructions for repairing at least one of a connection and a relationship associated with the at least one application dependency error.

13. The system for automatic application dependency mapping of claim 12, wherein the at least one command is identified automatically by execution of at least one rule and by accessing a stored repository of available commands.

14. The system for automatic application dependency mapping of claim 1, wherein the execution of at least one of (i) the plurality of extensible dependency harvester plugin modules, (ii) the rules defining the dependency harvester engine, (iii) the rules defining the dependency data transformation engine, (iv) the dependency visualization interface rules, and (v) the operating instructions, by the at least one electronic processing device, further results in:
  receiving, by the at least one electronic processing device and via the GUI, a request for a system migration analysis for at least one application;
  identifying, by the at least one electronic processing device and based on the processed first application dependency data, a plurality of application dependencies for the at least one application; and
  outputting, via the GUI and by the execution by the at least one electronic processing device of the dependency visualization interface rules, a graphical indication of the plurality of application dependencies for the at least one application.

15. The system for automatic application dependency mapping of claim 1, wherein the execution of at least one of (i) the plurality of extensible dependency harvester plugin modules, (ii) the rules defining the dependency harvester engine, (iii) the rules defining the dependency data transformation engine, (iv) the dependency visualization interface rules, and (v) the operating instructions, by the at least one electronic processing device, further results in:
  receiving, by the at least one electronic processing device and via the GUI, a request for a system migration analysis for at least one application;
  identifying, by the at least one electronic processing device and based on the processed first application dependency data, a plurality of application dependencies for the at least one application;
  identifying, by the at least one electronic processing device, a plurality of applications resident in a second environment;
  identifying, by the at least one electronic processing device and by comparing the plurality of application dependencies for the at least one application to the plurality of applications resident in the second environment, at least one application dependency error; and
  outputting, via the GUI and by the execution by the at least one electronic processing device of the dependency visualization interface rules, a graphical indication of the at least one application dependency error.

16. The system for automatic application dependency mapping of claim 1, wherein the execution of at least one of (i) the plurality of extensible dependency harvester plugin modules, (ii) the rules defining the dependency harvester engine, (iii) the rules defining the dependency data transformation engine, (iv) the dependency visualization interface rules, and (v) the operating instructions, by the at least one electronic processing device, further results in:
  executing a second calling, by an execution by the at least one electronic processing device of the rules defining the dependency harvester engine, of each extensible dependency harvester plugin module of the plurality of extensible dependency harvester plugin modules;
  identifying, by each extensible dependency harvester plugin module of the plurality of extensible dependency harvester plugin modules and in response to the second calling, and by activating a second subsystem in communication with the respective extensible dependency harvester plugin module of the plurality of extensible dependency harvester plugin modules, a second application dependency, wherein the second subsystem resides in a second environment;
  generating, by each extensible dependency harvester plugin module of the plurality of extensible dependency harvester plugin modules, data descriptive of the identified second application dependency;
  translating, by the execution by the at least one electronic processing device of the rules defining the dependency harvester engine, the data descriptive of the identified second application dependencies into the standardized format that represents the identified second application dependencies;
  storing, by the execution by the at least one electronic processing device of the rules defining the dependency harvester engine and in the database, the data descriptive of the identified second application dependencies in the standardized format that represents the identified second application dependencies;
  processing, by the execution by the at least one electronic processing device of the rules defining the dependency data transformation engine, the stored data descriptive of the identified second application dependencies in the standardized format that represents the identified second application dependencies, wherein the processing comprises generating processed second application dependency data by executing at least one functionality of (i) aggregating portions of the stored data that are descriptive of an identical dependency and (ii) creating a relationship between two or more portions of the stored data that share a common dependency;
  receiving, by the at least one electronic processing device and via the GUI, a request for a system migration verification for at least one application;
  identifying, by the at least one electronic processing device and based on the processed first application dependency data for the first environment, a plurality of application dependencies for the at least one application in the first environment;
  identifying, by the at least one electronic processing device, a first plurality of applications resident in the first environment that correspond to the plurality of application dependencies for the at least one application in the first environment;
  identifying, by the at least one electronic processing device and based on the processed second application dependency data for the second environment, a plurality of application dependencies for the at least one application in the second environment;
  identifying, by the at least one electronic processing device, a second plurality of applications resident in the second environment that correspond to the plurality of application dependencies for the at least one application in the second environment;
  identifying, by the at least one electronic processing device and by comparing the first and second plurality of applications resident in the first and second environments, at least one application matching error; and
  outputting, via the GUI and by the execution by the at least one electronic processing device of the dependency visualization interface rules, a graphical indication of the at least one application matching error.

17. The system for automatic application dependency mapping of claim 16, wherein the graphical indication of the at least one application matching error comprises a side-by-side graphical representation of the first and second plurality of applications resident in the first and second environments and an indication of at least one discrepancy between the first and second plurality of applications resident in the first and second environments.

18. The system for automatic application dependency mapping of claim 1, wherein the first calling is executed periodically.

19. The system for automatic application dependency mapping of claim 1, wherein the first calling is executed in accordance with a predetermined schedule.

20. The system for automatic application dependency mapping of claim 1, wherein the first calling comprises an execution of a micro-batch process.

21. The system for automatic application dependency mapping of claim 1, wherein the first calling is executed in response to a triggering event.

22. The system for automatic application dependency mapping of claim 21, wherein the triggering event comprises a notification of an event received from one of the first subsystems.

23. The system for automatic application dependency mapping of claim 1, wherein at least one of the identified first application dependencies comprises a dependency upon a particular data field in the database.

24. The system for automatic application dependency mapping of claim 1, wherein at least one of the identified first application dependencies comprises a dependency upon a particular application programming interface (API).

25. The system for automatic application dependency mapping of claim 1, wherein the data descriptive of the identified first application dependencies is defined in accordance with a predefined data contract between each extensible dependency harvester plugin module of the plurality of extensible dependency harvester plugin modules and the respective first subsystem.

26. The system for automatic application dependency mapping of claim 1, wherein the translating is performed in accordance with a predefined data contract between each extensible dependency harvester plugin module of the plurality of extensible dependency harvester plugin modules and the rules defining the dependency harvester engine.

27. The system for automatic application dependency mapping of claim 26, wherein each predefined data contract is the same.

* * * * *